US008589532B2

(12) United States Patent
Tenny et al.

(10) Patent No.: US 8,589,532 B2
(45) Date of Patent: Nov. 19, 2013

(54) APPARATUS AND METHOD FOR DETERMINING WLAN ACCESS POINT POSITION

(75) Inventors: Nathan Edward Tenny, Poway, CA (US); Farrokh Khatibi, Del Mar, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1495 days.

(21) Appl. No.: 11/449,540

(22) Filed: Jun. 7, 2006

(65) Prior Publication Data

US 2007/0002813 A1  Jan. 4, 2007

Related U.S. Application Data

(60) Provisional application No. 60/693,727, filed on Jun. 24, 2005.

(51) Int. Cl.
G06F 15/173 (2006.01)
(52) U.S. Cl.
USPC .......................................... 709/224; 709/223
(58) Field of Classification Search
USPC .................................................. 709/223, 224
See application file for complete search history.

(56) References Cited

U.S. PATENT DOCUMENTS

| | | | |
|---|---|---|---|
| 5,850,609 | A | 12/1998 | Sugarbroad et al. |
| 6,888,811 | B2 | 5/2005 | Eaton |
| 7,990,912 | B2 | 8/2011 | Nix, Jr. et al. |
| 2002/0177460 | A1* | 11/2002 | Beasley et al. ................ 455/502 |
| 2003/0134657 | A1 | 7/2003 | Norta et al. |
| 2004/0002346 | A1* | 1/2004 | Santhoff ..................... 455/456.1 |
| 2004/0009778 | A1* | 1/2004 | Makuta ....................... 455/456.1 |
| 2004/0066759 | A1 | 4/2004 | Molteni et al. |
| 2004/0203914 | A1* | 10/2004 | Kall et al. .................. 455/456.1 |

(Continued)

FOREIGN PATENT DOCUMENTS

| | | |
|---|---|---|
| EP | 1289329 A1 | 3/2003 |
| EP | 1289329 A1 | 3/2003 |

(Continued)

OTHER PUBLICATIONS

International Search Report- PCT/US2006/024501, International Search Authority/EPO, Nov. 11, 2006 (2 pages).

(Continued)

*Primary Examiner* — Wing F Chan
*Assistant Examiner* — Andrew Woo
(74) *Attorney, Agent, or Firm* — Shyam K. Parekh; Mary A. Fales

(57) ABSTRACT

Position of a WLAN access point (AP) is determined by reference to user equipment devices (UEs) in communication with the AP and with a radio network interworked with the WLAN. The AP position may be assumed to be the same as position of any UE in communication with the AP. UE positions may be averaged for a plurality of UEs, a plurality of positions of the same UE, or a combination of such UE positions. Round-trip time (RTT) may be measured between a plurality of UEs and the AP, and the AP position may be trilaterated from the RTT measurements and the UE positions. AP position may also be trilaterated from positions of the same UE in combination with RTTs between the AP and the UE, measured at different times. The computations of the AP position may be hosted at the WLAN or the radio network.

67 Claims, 20 Drawing Sheets

(56) References Cited

U.S. PATENT DOCUMENTS

| | | |
|---|---|---|
| 2005/0043038 A1 | 2/2005 | Maanoja et al. |
| 2005/0101331 A1 | 5/2005 | Tamaki et al. |
| 2005/0213538 A1 | 9/2005 | Ebiko et al. |
| 2006/0003710 A1 | 1/2006 | Nakagawa et al. |
| 2006/0009235 A1* | 1/2006 | Sheynblat et al. ......... 455/456.1 |
| 2006/0211431 A1 | 9/2006 | Mansour et al. |
| 2007/0112948 A1* | 5/2007 | Uhlik ............................ 709/223 |
| 2007/0167147 A1* | 7/2007 | Krasner et al. ............. 455/404.2 |
| 2008/0244148 A1 | 10/2008 | Nix, Jr. et al. |
| 2008/0318596 A1 | 12/2008 | Tenny |

FOREIGN PATENT DOCUMENTS

| | | |
|---|---|---|
| EP | 1313270 A2 | 5/2003 |
| EP | 1313270 A2 | 5/2003 |
| EP | 1469368 A | 10/2004 |
| EP | 1469368 A1 | 10/2004 |
| JP | 2004088148 A | 3/2004 |
| JP | 2004128579 A | 4/2004 |
| JP | 2004266818 | 9/2004 |
| JP | 2005123833 A | 5/2005 |
| WO | WO03010552 A2 | 2/2003 |
| WO | 2004/064327 A1 | 7/2004 |
| WO | WO 2004/064327 A1 | 7/2004 |

OTHER PUBLICATIONS

Written Opinion—PCT/US2006/024501—International Search Authority, European Patent Office, Jul. 11, 2006.

3GPP TR 25.820 v8.0.0 (Mar. 2008), entitled 3rd Generation Partnership Project; Technical Specification Group Radio Access Networks; 3G Home NodeB Study Item Technical Report (Release 8).

3GPP TS 36.300 v8.4.0 (Mar. 2008), 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 8).

Mitsubishi Electric, "Whereability of HNBs," R3-071237, 3GPP TSG SA WG5 and RAN WG3 LTE Adhoc, Sophia-Antipolis, France, Jun. 13th-14th, 2007, 4 pages.

* cited by examiner

APPARATUS AND METHOD FOR DETERMINING WLAN ACCESS POINT POSITION

CLAIM OF PRIORITY UNDER 35 U.S.C. §119

The present Application for Patent claims priority to Provisional Application Ser. No. 60/693,727, entitled WLAN Access Point Positioning Via Interworked UMTS LCS, filed on Jun. 24, 2005. This provisional application is assigned to the assignee of the present Application, and is expressly incorporated by reference as if fully set forth herein, including all figures and tables.

BACKGROUND

1. Field

The present invention relates generally to telecommunications, and, more specifically, to methods and apparatus for determining geographic position of an access point of a wireless local area network (WLAN) interworked with a radio network providing communication services to user equipment devices.

2. Background

A modern communication system is expected to provide reliable data transmission for a variety of applications, including voice and data applications. In a point-to-multipoint communications context, known communication systems are based on frequency division multiple access (FDMA), time division multiple access (TDMA), code division multiple access (CDMA), and perhaps other multiple access communication schemes.

A CDMA system may be designed to support one or more CDMA standards, such as (1) the "TIA/EIA-95 Mobile Station-Base Station Compatibility Standard for Dual-Mode Wideband Spread Spectrum Cellular System" (this standard with its enhanced revisions A and B may be referred to as the "IS-95 standard"), (2) the "TIA/EIA-98-C Recommended Minimum Standard for Dual-Mode Wideband Spread Spectrum Cellular Mobile Station," also known as the "IS-98 standard," (3) the standard sponsored by a consortium named "3rd Generation Partnership Project" (3GPP) and embodied in a set of documents including documents known as 3G TS 25.211, 3G TS 25.212, 3G TS 25.213, and 3G TS 25.214 (the "W-CDMA standard"), (4) the standard sponsored by a consortium named "3rd Generation Partnership Project 2" (3GPP2) and embodied in a set of documents including "C.S0002-A Physical Layer Standard for cdma2000 Spread Spectrum Systems," the "C.S0005-A Upper Layer (Layer 3) Signaling Standard for cdma2000 Spread Spectrum Systems," (the "cdma2000 standard" collectively), (5) the 1xEV-DO standard "TIA/EIA/IS-856 cdma2000 High Rate Packet Data Air Interface Specification," and (6) certain other standards. The standards listed above are incorporated by reference as if fully set forth herein, including annexes, appendices, and other attachments.

Many user equipment (UE) devices, for example, cellular telephones and personal digital assistants (PDAs), are configured for use with multiple wireless access technologies. For example, a cellular telephone may be capable of connecting to a CDMA Universal Mobile Telecommunications System (UMTS) network, and to a WLAN, such as a local area network compliant with one or more of the Institute of Electrical and Electronic Engineers (IEEE) 802.11 standards. When such a user equipment device is in the service area of an access point of a WLAN, the access point may enable the user equipment device to make wireless connections through the WLAN, reducing the load on the cellular radio network that would otherwise need to carry the traffic of the user equipment device. (An access point is a device that mediates over-the-air interface of the WLAN technology and the wired backhaul or other connectivity of the WLAN to external networks.) Moreover, a connection through a WLAN may provide higher bandwidth and/or better quality of service (QoS) than would be available to the user equipment device directly from the UMTS radio network.

It is desirable and sometimes required for a provider of communication services to know the geographic location of the serviced telephones and other user equipment devices. For example, the geographic location may need to be known in order to identify the location to operators responding to an emergency (e.g., 911 in U.S. and 112 in certain European locales) call; it may also be desired to provide the user with other location-specific services and advertising.

In case of conventional land-line telephones, determining the geographic location generally does not present a problem, because each land line is associated with a physical address at which the service is provided.

In case of conventional cellular telephones connected to a radio network, determining the geographic location of a telephone also generally does not present a problem. For example, the enhanced 911 (e911) feature in the 911 emergency-calling system of North American telephone network (NATN) may activate global positioning system services, or triangulate/trilaterate from base transceiver stations of the radio network, in order to determine the telephone's geographic location, and then transmit the location through the radio network to the telephone service provider and emergency operator.

When connectivity is provided to a user equipment device through a WLAN access point, however, the above-described method may not apply. Even assuming that the user equipment device is in the immediate vicinity of the access point (because of the relatively short WLAN communication range), the location of the access point itself may not be known. Consider, for example, an access point of a WLAN that is configured to provide telephone services through voice over Internet Protocol (VoIP). The geographic location of the access point may not be initially known, or the provisioning of the access point may be done incorrectly. Even when the geographic location of the access point is known at some point in time and the access point is correctly provisioned, the access point or the entire WLAN may be subsequently moved and connected to the Internet from a different physical location. In this case, the new location of the access point may not be known to the provider of the telephone services through that access point. The new location may be in the same building as the old location, or it may be thousands of miles away. The telephone service provider may remain unaware of the new location and of the very fact that the access point has been moved. Thus, the emergency operator may not be able to dispatch emergency services, or may dispatch emergency services to the old location instead of the new one.

One solution to this problem might be to instrument WLAN access points with a global positioning system (GPS) receiver to allow the access point to determine its location. Cost of the GPS receiver, however, may make this approach not competitive, particularly in the consumer marketplace, where the WLAN access point is often a single piece of critically price-sensitive hardware.

There is therefore a need in the art for methods and apparatus for determining geographic location of WLAN access points not instrumented with GPS receivers, and determining changes in the geographic location of the WLAN access points.

SUMMARY

Embodiments disclosed herein address the above stated needs by providing a mechanism for determining WLAN access point position by reference to user equipment devices in the service area of the access point.

In an embodiment, a method is provided for estimating geographic position of an access point of a Wireless Local Area Network. The method includes sending a request for position information of a user equipment device of a cellular radio network, the UE device being in communication with the access point over the WLAN. The method further includes receiving the position information in response to the request, and assigning the position information to an estimate of the geographic position of the access point.

In an embodiment, a method is provided for estimating geographic position of an access point of a Wireless Local Area Network. The method includes sending a plurality of requests for position information, each request of the plurality of requests relating to position information of one or more User Equipment devices in communication with a cellular radio network. Each UE device of the one or more UE devices is in a service area of the access point. The method further includes receiving in response to the plurality of requests a plurality of replies with position information, and computing an estimate of the geographic position of the access point based at least in part on the plurality of the received replies.

In an embodiment, a method is provided for facilitating estimation of geographic position of an access point of a Wireless Local Area Network. The method includes sending from a cellular radio network a plurality of requests for position information, each request of the plurality of requests relating to position information of one or more User Equipment devices of the cellular radio network. Each UE device of the one or more UE devices is in communication with the access point over the WLAN. The method further includes receiving in response to the plurality of requests a plurality of replies with position information, and transmitting the position information of each reply of the plurality of replies from the cellular radio network to the access point.

In an embodiment, a method is provided for provisioning an estimate of geographic position of an access point of a Wireless Local Area Network. The method includes sending from a cellular radio network a plurality of requests for position information, each request for position information of the plurality of requests relating to position information of one or more User Equipment devices of the cellular radio network. Each UE device of the one or more UE devices is in communication with the access point over the WLAN. The method further includes receiving, in response to the plurality of requests, a plurality of replies with position information, and computing the estimate of the geographic position of the access point based at least in part on the plurality of replies. The estimate is then transmitted from the cellular radio network to the access point.

In an embodiment, a method is provided for provisioning an estimate of geographic position of an access point of a Wireless Local Area Network. The method includes determining at a cellular radio network a plurality of UE device positions, each UE device position corresponding to position of at least one User Equipment device of the cellular radio network while the device is in communication with (located within service area of) the access point over the WLAN. The method further includes computing the estimate of the geographic position of the access point based at least in part on the plurality of UE device positions, and transmitting the estimate from the cellular radio network to the access point.

In an embodiment, an access point of a WLAN includes a WLAN transceiver, a machine readable memory storing program code, and a processor coupled to the memory and to the WLAN transceiver. The processor is configured to cause the access point to (1) send a request for position information of a user equipment device of a cellular radio network, the UE device being in communication with the access point over the WLAN;

(2) receive the position information in response to the request; and (3) assign the position information to an estimate of the geographic position of the access point.

In an embodiment, an access point of a WLAN includes a WLAN transceiver, a connection to a second network interface connecting the access point to a cellular radio network, a machine readable memory storing program code, and a processor coupled to the memory and to the WLAN transceiver. The processor is configured to cause the access point to (1) send a plurality of requests for position information, each request relating to position information of one or more User Equipment devices in communication with the cellular radio network and located in a service area of the access point;

(2) receive in response to the plurality of requests a plurality of replies with position information; and (3) compute an estimate of the geographic position of the access point based at least in part on the plurality of the received replies.

In an embodiment, machine-readable memory stores program code instructions for a processor of a WLAN access point. When executed by the processor, the processor configures the access point to (1) send a plurality of requests for position information, each request of the plurality of requests relating to position information of one or more User Equipment devices in communication with a cellular radio network and located in a service area of the access point;

(2) receive, in response to the plurality of requests, a plurality of replies with position information; and (3) compute an estimate of the geographic position of the access point based at least in part on the plurality of the received replies.

In an embodiment, a radio network controller of a cellular radio network includes a BTS interface to a base transceiver station, a network interface coupling the radio network controller to a WLAN with an access point, a machine readable memory storing program code, and a processor coupled to the memory, the BTS interface, and the network interface. The processor is configured to cause the radio network controller to (1) send a plurality of requests for position information, each request of the plurality of requests relating to position information of one or more User Equipment devices in communication with the cellular radio network and located in a service area of the access point;

(2) receive in response to the plurality of requests a plurality of received replies with position information;

(3) compute an estimate of the geographic position of the access point based at least in part on the plurality of the received replies; and (4) transmit the estimate to the access point via the network interface.

In an embodiment, a radio network controller of a cellular radio network includes a BTS interface to a base transceiver station, a network interface coupling the radio network controller to a WLAN with an access point, a machine readable memory storing program code, and a processor coupled to the memory, the BTS interface, and the network interface. The processor is configured to cause the radio network controller to (1) send a plurality of requests for position information, each request of the plurality of requests relating to position information of one or more User Equipment devices in communication with the cellular radio network and located in a service area of the access point;

(2) receive in response to the plurality of requests a plurality of replies with position information; and (3) transmit the plurality of replies to the access point via the network interface.

In an embodiment, a machine-readable memory stores program code instructions. When the instructions are executed by a processor of a radio network controller of a cellular radio network, the processor configures the radio network controller to (1) send a plurality of requests for position information, each request of the plurality of requests relating to position information of one or more User Equipment devices in communication with the cellular radio network and located in a service area of a WLAN access point;

(2) receive in response to the plurality of requests a plurality of replies with position information;

(3) compute an estimate of the geographic position of the access point based at least in part on the plurality of the replies; and (4) transmit the estimate to the access point via the network interface.

In an embodiment, a machine-readable memory stores program code instructions. When the instructions are executed by a processor of a radio network controller of a cellular radio network, the processor configures the radio network controller to (1) send a plurality of requests for position information, each request of the plurality of requests relating to position information of one or more User Equipment devices in communication with the cellular radio network and located in a service area of a WLAN access point;

(2) receive in response to the plurality of requests a plurality of replies with position information; and (3) transmit the replies to the access point via a network interface of the radio network controller.

These and other embodiments and aspects of the present invention will be better understood with reference to the following description, drawings, and appended claims.

DETAILED DESCRIPTION

In this document, the words "embodiment," "variant," and similar expressions are used to refer to particular apparatus, process, or article of manufacture, and not necessarily to the same apparatus, process, or article of manufacture. Thus, "one embodiment" (or a similar expression) used in one place or context can refer to a particular apparatus, process, or article of manufacture; the same or a similar expression in a different place can refer to a different apparatus, process, or article of manufacture. The expression "alternative embodiment" and similar phrases are used to indicate one of a number of different possible embodiments. The number of possible embodiments is not necessarily limited to two or any other quantity.

The word "exemplary" is used herein to mean "serving as an example, instance, or illustration." Any embodiment described herein as "exemplary" is not necessarily to be construed as preferred or advantageous over other embodiments. All of the embodiments described in this description are exemplary embodiments provided to enable persons skilled in the art to make or use the invention, and not to limit the scope of legal protection afforded the invention, which is defined by the claims and their equivalents.

Base transceiver stations ("BTSs") and base station controllers ("BSCs") are parts of a network called "radio network," "RN," "access network," "AN," "radio access network," or "RAN." A base station controller may also be referred to as a radio network controller or "RNC." Radio network may be a UTRAN or UMTS Terrestrial Radio Access Network. The radio network may transport data packets between multiple user equipment devices. The radio network may be further connected to additional networks outside the radio network, such as a corporate intranet, the Internet, or a conventional public switched telephone network ("PSTN"), and may transport data packets between each user equipment device and such outside networks.

Figure 1:
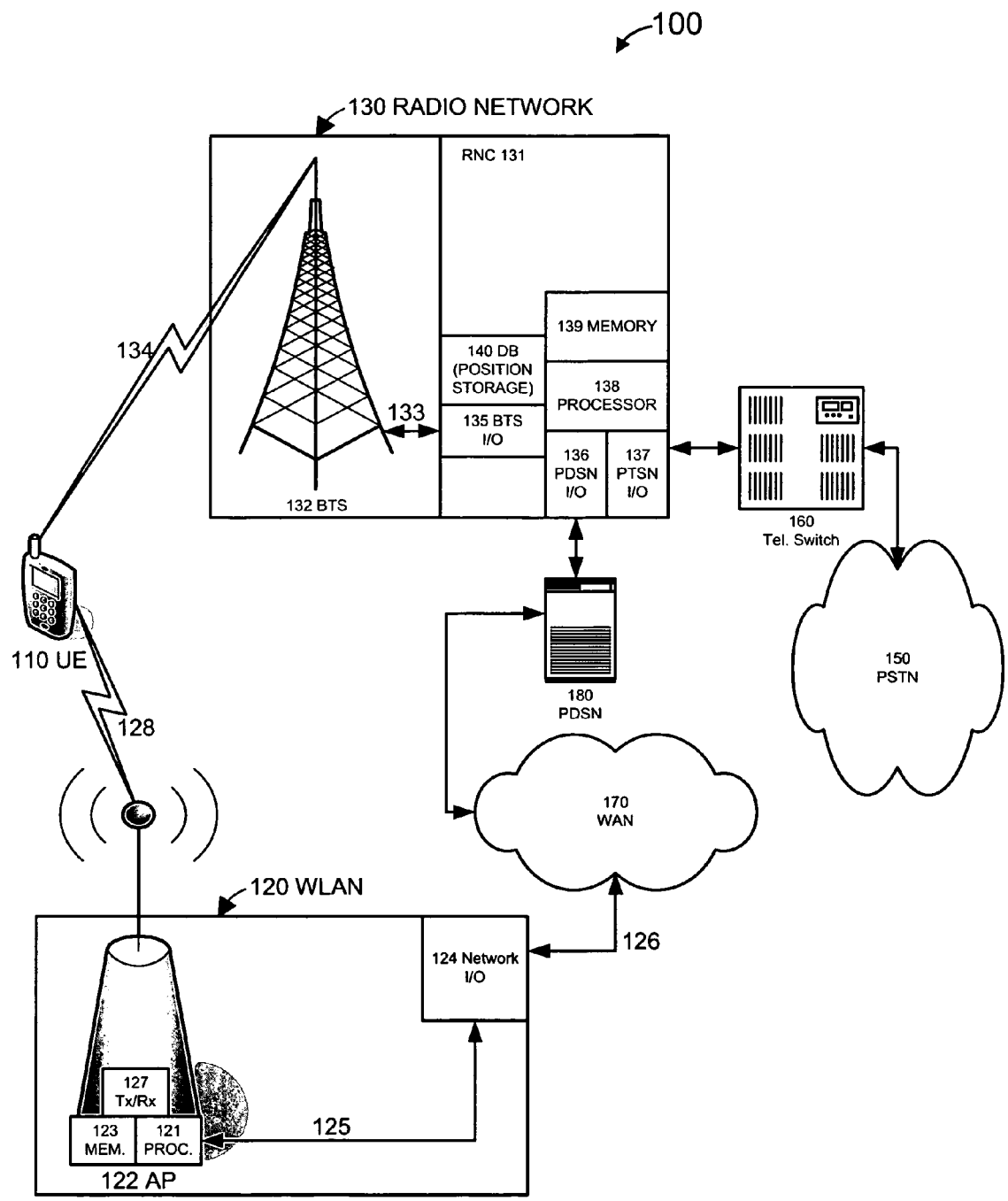
FIG. 1 is a high-level block diagram illustrating selected components of a system that includes a communication network configured in accordance with an embodiment of the present invention.

FIG. 1 is a high-level block diagram that illustrates selected components of a combination 100, which includes a user equipment device (here a cellular telephone) 110, a wireless local area network 120, and a cellular system radio network 130. The user equipment device 110 communicates with both of these networks. The WLAN 120 and the radio network 130 are in an interworking relationship and communicate with each other through a packet switched wide area network (WAN) 170 and a packet data server node 180.

The radio network includes a radio network controller 131 and a base transceiver station 132. In some variants, the radio network 130 is a CDMA UMTS radio network. The radio network controller 131 communicates with the base transceiver station 132 over a communication link 133. As a person skilled in the art would understand after perusal of this document, the radio network 130 may include additional base transceiver stations, additional radio network controllers, additional communication links, as well as other components.

The radio network controller 131 is further coupled to a public switched telephone network 150 through a telephone switch 160, and to the WAN 170 through the PDSN 180. Data interchange between various network elements, such as the radio network controller 131 and the packet data server node 180, can be implemented using any number of protocols, for example, the Internet Protocol (IP), an asynchronous transfer mode (ATM) protocol, T1, E1, frame relay, and other protocols.

As shown in FIG. 1, the radio network controller 131 includes a BTS interface 135 to the base transceiver station 132, a PDSN interface 136 to the PDSN 180, a PTSN interface 137 to the telephone switch 160, and a database 140 for position storage. The database 140 may also be implemented as part of the memory 139. The database 140 and the interfaces 135, 136, and 137 operate under control of one or more processors 138 executing program code stored in one or more memory devices 139.

Figure 2:
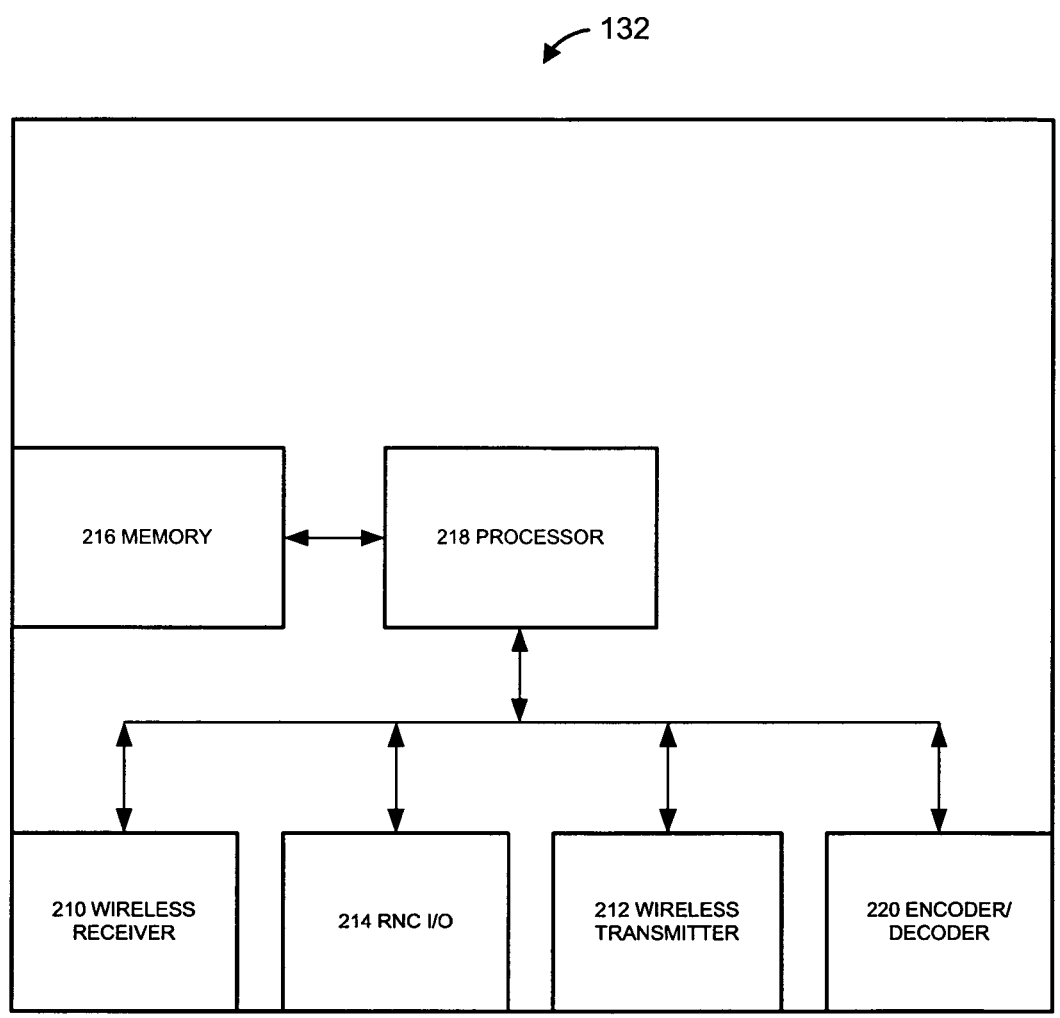
FIG. 2 is a high-level block diagram illustrating selected components of a base transceiver station used in a communication network configured in accordance with an embodiment of the present invention.

FIG. 2 is a high-level block diagram illustrating selected components of the base transceiver station 132. In this embodiment, the base transceiver station 132 includes a wireless receiver 210, wireless transmitter 212, radio network controller interface 214, memory 216, processor 218, and encoder/decoder circuitry 220. The receiver 210, transmitter 212, RNC interface 214, and encoder/decoder 220 are configured by the processor 218 operating under control of program code stored in the memory 216, to establish forward and reverse links with the user equipment device 110 in order to send data packets to and receive data packets from the user equipment device 110. In the case of data services, for example, the base transceiver station 132 receives forward link data packets from the packet switched network 170 through the packet data server node 180 and through the radio network controller 131, and transmits these packets to the user equipment device 110. The base transceiver station 132 receives reverse link data packets that originate at the user equipment device 110, and forwards these packets to the packet switched network 170 through the radio network controller 131 and the packet data server node 180. In the case of telephone services, the base transceiver station 132 receives forward link data packets from the telephone network 150 through the telephone switch 160 and through the radio network controller 131, and transmits these packets to the user equipment device 110. Voice carrying packets originating at the user equipment device 110 are received at the base transceiver station 132 and forwarded to the telephone network 150 via the radio network controller 131 and the telephone switch 160. Telephone/voice services may also be routed through the WAN 170.

In the illustrated embodiment, the cellular radio network 130 provides both data communication services and voice telephone services to the user equipment device 110. In alternative embodiments, the cellular radio network 130 may provide only data services or only voice telephone services to the user equipment device 110.

Depending on conventions and on the specific implementation variants, the base transceiver station 132 may take other forms and be referred to by other names, such as Node-B or base station system ("BSS"). Similarly, the radio network controller 131 may take other forms and be referred to by other names, such as base station controller, mobile switching center, or serving GPRS support node. The scope of the invention extends to these and similar wireless communication system components.

The wireless local area network 120 provides wireless access within a local geographic area, for example, an office suite or building, residence, shop, shopping mall, cybercafé, or vehicle (train, plane, ship). Typically, the WLAN 120 provides a substantially shorter communication range than the base transceiver station 132 of the radio network 130. In some embodiments, the range of each access point of the WLAN 120 is 1000 meters or less; in more specific embodiments, the range of each access point of the WLAN 120 is 100 meters or less. In some embodiments, the range of the base transceiver station 132 in at least some area of coverage is at least twice the range of each access point of the WLAN 120; in more specific embodiments, the range of the base transceiver station 132 in at least some area is at least ten times the range of each access point of the WLAN 120. In some embodiments, the WLAN 120 operates in compliance with the 802.11 family of Wi-Fi standards developed by working group 11 of the IEEE LAN/MAN Standards Committee, including various amendments of these standards. In particular, the WLAN 120 may operate under the IEEE 801.11a, 802.11b, 802.11g Wi-Fi standards. The 802.11b and 802.11g standards specify operation in the 2.4 GHz band, while the 802.11 standard specifies operation in the 5 GHz band. In some embodiments intended for use in the United States, the WLAN 120 may be operated without a license. In some embodiments intended for use in the United States, the WLAN 120 may be operated without a license in the Amateur Radio band of electromagnetic spectrum. Typically, the WLAN 120 and the radio network 130 operate on different frequencies and use different encoding techniques.

It should be noted that the invention is not necessarily limited to WLAN that operates under the 802.11 standards.

The WLAN 120 includes an access point 122 coupled to a network interface 124, which is coupled (directly or indirectly) to the WAN 170 via a backhaul line 126. It should be noted that the WLAN 120 may be coupled to a network other than the WAN 170, or coupled to several networks, which may include the WAN 170. The WAN 170 provides interworking connectivity between the radio network 130 and the WLAN 120, as discussed in more detail later in this document.

The access point 122 mediates over-the-air interface of the WLAN 120 technology and the internal connectivity provided by the WLAN 120, for example, the connectivity of a line 125 that connects the access point 122 to the network interface 124. It should be noted that, in some embodiments, the network interface 124 may be incorporated in and become part of the access point 122, so that the access point 122 mediates over-the-air interface of the WLAN 120 and the backhaul line 126.

As shown in FIG. 1, the access point 122 includes a memory 123 storing instructions, a processor 121 coupled to the memory 123 and configured to execute the instructions, and a wireless transceiver 127 coupled to the processor 121 and configured to operate under the applicable standard, such as the IEEE 802.11 standards discussed above.

The backhaul line 126 may be wired, wireless, or combine both wired and wireless segments.

Figure 3:
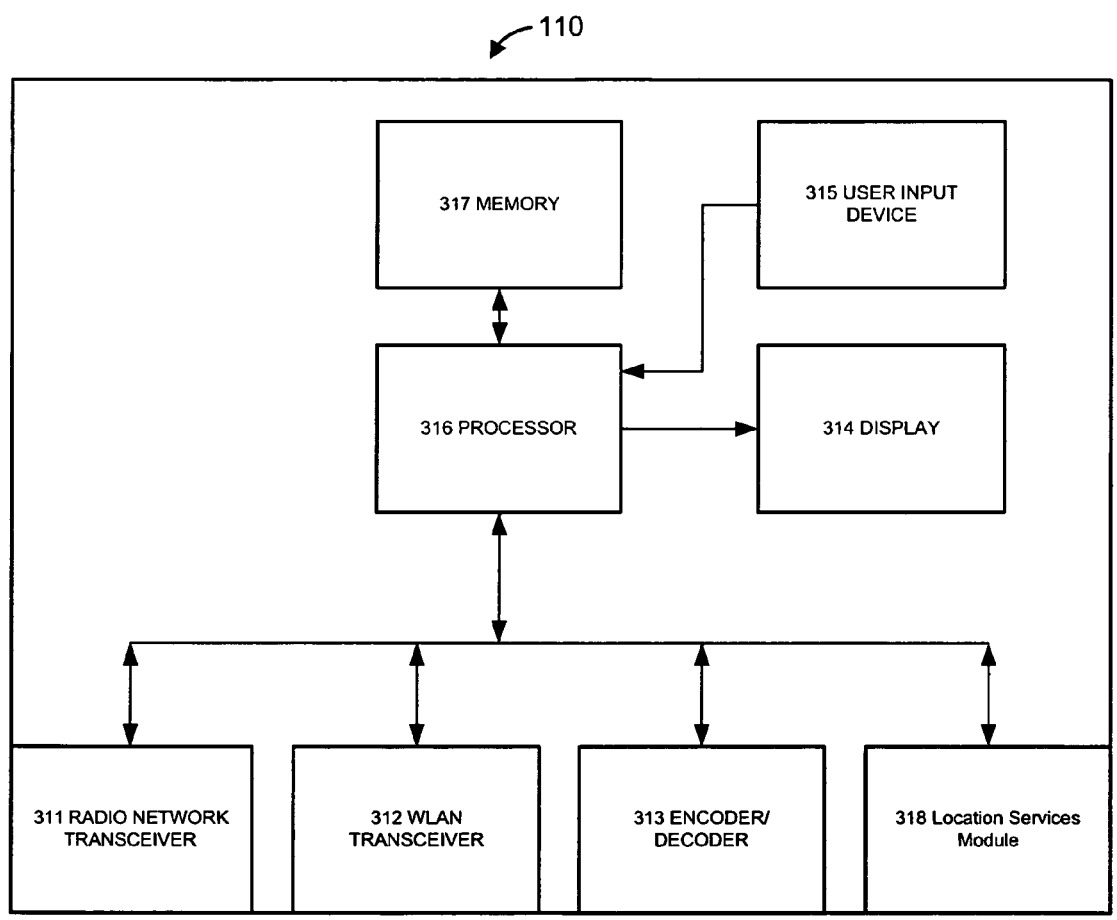
FIG. 3 is a high-level block diagram illustrating selected components of a user equipment device used in a communication network configured in accordance with an embodiment of the present invention.

The user equipment device 110 may be a cellular telephone, personal digital assistant with wireless capability, wireless PC card, external or internal wireless modem, or another mobile communication device. FIG. 3 is a high-level block diagram that shows selected components of one embodiment of the user equipment device 110. As illustrated in FIG. 3, the user equipment device 110 includes a radio network transceiver (radio network receiver and transmitter) 311, wireless local area network transceiver (WLAN receiver and transmitter) 312, encoder and decoder circuitry 313, display 314 (e.g., an LCD), user input device 315 (e.g., a keypad), processor 316, memory 317, and location services module 318 (LCS, e.g., a global positioning system receiver). The radio network transceiver 311, WLAN transceiver 312, encoder and decoder circuitry 313, display 314, user input device 315, and location services module 318 are configured by the processor 316 executing code stored in the memory 317. The user equipment device 110 is configured to communicate with the radio network 130 over a wireless communication link 134. The communications between the user equipment device 110 and the radio network 130 use a wireless cellular network transmission protocol, such as the cellular packet transmission protocols described above. The user equipment device 110 is further configured to communicate with the WLAN 120 over a wireless communication link 128. The communications between the user equipment device 110 and the WLAN 120 use a wireless local area network protocol, such as the IEEE 802.11 standard-compliant protocols.

In performing the various methods described in this document, the access point 122, UE 110, BTS 132, and RNC 131 may be appropriately configured to carry out process steps (e.g., send and receive communication messages) by their respective controllers executing code stored in their respective memories.

As illustrated in FIG. 1, the combination 100 includes one public switched telephone network and one packet switched wide area network. A person skilled in the art would recognize, after perusal of this document, that alternative embodiments in accordance with aspects of the invention need not be limited to a particular number of these or other networks. For example, the communication network 100 may connect the user equipment devices 110 to one or more additional communication networks, such as a second wireless communication network having a number of wireless user equipment devices. The WLAN 120 may connect via the backhaul line 126 to a network other than the WAN 170 (which is connected to the PDSN 180). The WLAN 120 may be connected to the WAN 170 indirectly, for example, through one or more other networks. User equipment devices in addition to the UE 110 may also be present and communicate with the WLAN 120 and the RNC 130.

The geographic location of the access point 122 is determined by reference to (based on) the position data of the user equipment device 110 and possibly by reference to position data of other, similar, user equipment devices that are in communication with both the access point 122 and the radio network 130. A position estimate of the user equipment device 110 (and of other user equipment devices) may be determined by the radio network, for example, by triangulation or trilateration from multiple base transceiver stations. The position estimate of the user equipment device 110 and of other user equipment devices may also be determined through the respective location services modules of the user equipment devices, such as GPS receivers.

Figure 4A:
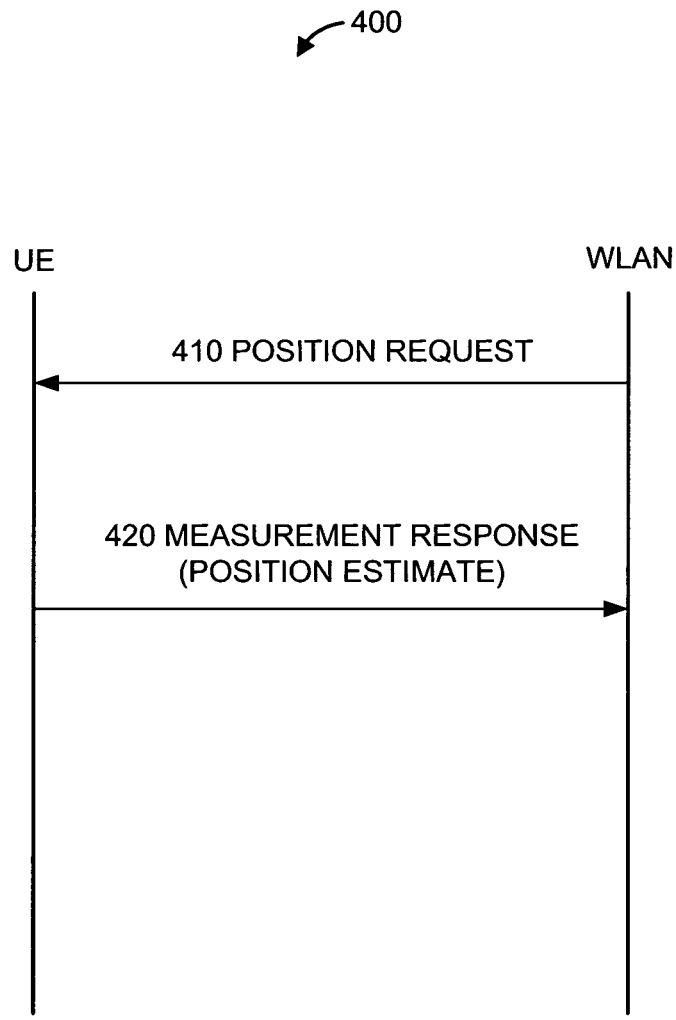
FIG. 4A is a diagram illustrating an exchange of selected messages through which an access point may obtain position data of a user equipment device, in accordance with an embodiment of the present invention.

The user equipment device 110 may communicate the estimate of its position directly to the access point 122. This is illustrated in FIG. 4A, which shows an exchange 400 of selected messages in the combination 100 through which the WLAN access point 122 may obtain the position estimate of the user equipment device 110 and of other user equipment devices in WLAN communication with the access point 122. In the course of the message exchange 400, the access point 122 sends a position request message 410 to the user equipment device 110, either through the WLAN link 128, or through the backhaul line 126, WAN 170, PDSN 180, and radio network 130, using an interworking protocol designed for exchange of messages, such as control messages and messages for providing position estimates to the access point 122. The user equipment device 110 receives the message 410 through its WLAN transceiver 312 or through the radio network 130 and, in response to receiving the position request message 410, sends a measurement response message 420 to the WLAN 120 using the WLAN transceiver 312. Note that the user equipment device 110 may estimate its position in response to the receipt of the message 420, or it may respond with a previously-obtained and stored position estimate. Note that the stored estimate should have been obtained relatively recently, while the user equipment device was in the service area of the access point. The measurement response message 420 contains the position estimate of the user equipment device 110. The access point 122 receives through its WLAN transceiver (not shown) the message 420 and the position estimate of the user equipment device 110 contained in it.

The user equipment device 110 may also provide its position estimate to the WLAN 120 automatically, i.e., not in response to a position request from the WLAN 120. For example, the user equipment device 110 may provide its position estimate to the WLAN 120 periodically while it is in the service area of the access point 122.

Figure 4B:
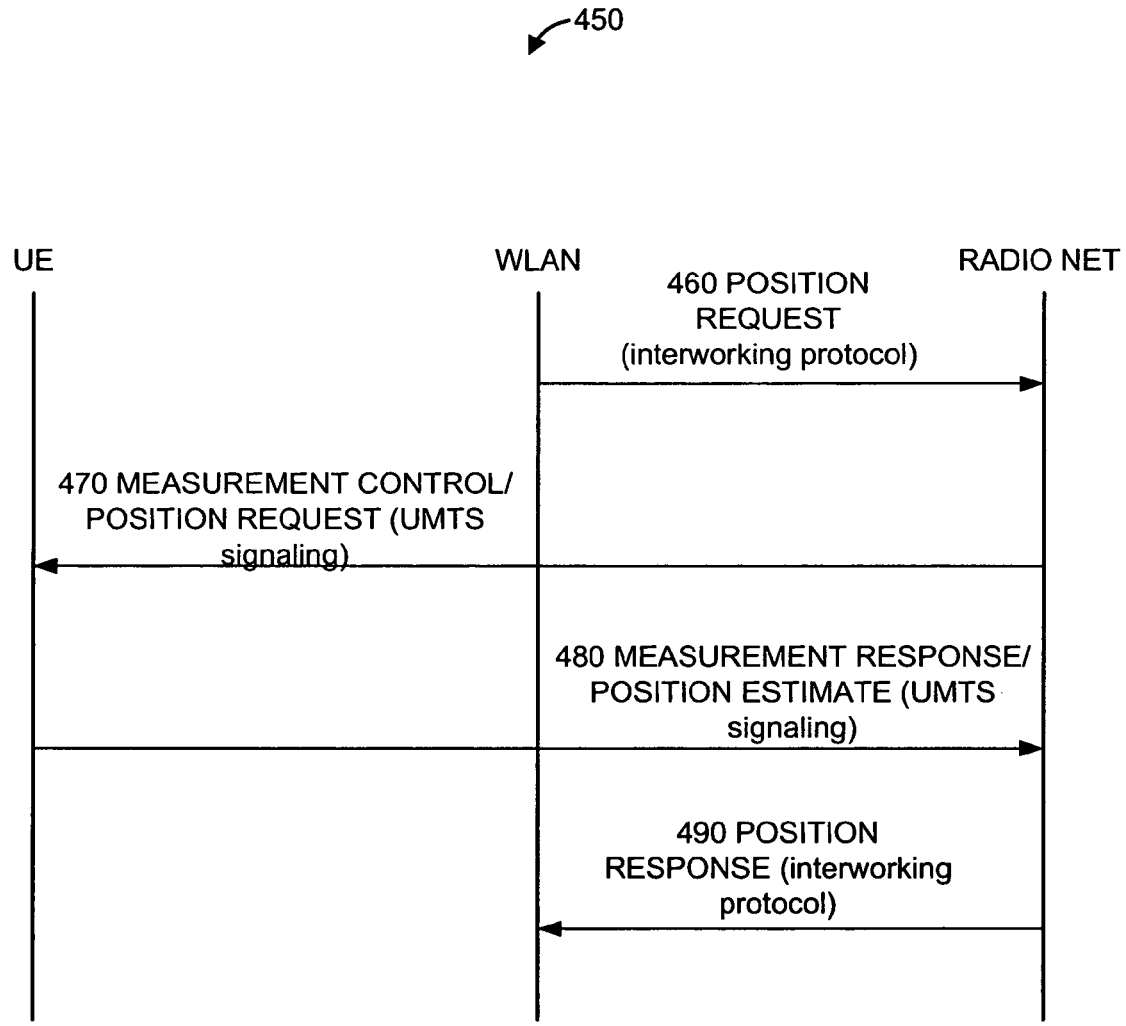
FIG. 4B is a diagram illustrating another exchange of selected messages through which an access point may obtain position data of a user equipment device, in accordance with an embodiment of the present invention.

FIG. 4B shows another exchange 450 of selected messages in the combination 100. In the course of the message exchange 450, the WLAN access point 122 sends a position request message 460 to the radio network controller 131 of the radio network 130 through the line 125, WLAN network interface 124, backhaul line 126, WAN 170, PDSN 180, and PDSN interface 136. Signaling between the WLAN 120 and the radio network 130 is performed using the interworking protocol for communications between the WLAN 120 and the radio network 130. The RNC 131 receives the position request message 460 and, in response to the message 460, communicates with the BTS 132, causing the BTS 132 to send a measurement control message 470 to the user equipment device 110 via the radio network air interface. (The air interface may implement UMTS signaling.) The measurement control message 470 includes a request for position estimate of the user equipment device 110.

The user equipment device 110 receives the message 470 and, in response, sends a measurement response message 480 to the radio network 130 via the air interface. The measurement response message 480 includes a position estimate of the user equipment device 110. As in the exchange illustrated in FIG. 4A, the user equipment device 110 may estimate its position in response to the receipt of the message 470, or it may respond with a previously-obtained and stored position estimate. Note that the stored estimate should have been obtained relatively recently, while the user equipment device was in the service area of the access point.

The user equipment position estimate contained in the message 480 is forwarded from the BTS 132 to the RNC 131. The RNC 131 then sends a position response message 490 back to the WLAN access point 122. The message 490 may use the interworking protocol, and traverse the same route as the message 460 (but in reverse order).

The radio network 130 may obtain the position estimate of the user equipment device 110 through the messages 470 and 480 in response to the position request message 460, as discussed in the preceding paragraphs. In some circumstances, the radio network 130 may have a relatively current position estimate of the user equipment device 110. For example, the radio network 130 may have obtained the position estimate from the user equipment device 110 shortly before (i.e., within a predetermined time period of) the receipt of the position request message 460. In this case, the messages 470 and 480 may be omitted, and the position response message 490 with the position estimate of the user equipment device 110 may be sent to the access point without delay.

In other embodiments, the radio network 130 obtains the position estimate of the user equipment device 110 through location services available at the network 130, without explicitly requesting the position estimate from the user equipment device 110. For example, the radio network 130 may cause each of two or more base transceiver stations to determine their respective directions to the user equipment device 110, and then estimate the position of the user equipment device 110 by triangulation. Similarly, the radio network 130 may cause a plurality of base transceiver stations to determine their respective distances to the user equipment device 110 by measuring round-trip time (RTT) to the device 110, and then estimate the position of the user equipment device 110 by trilateration. In these embodiments, the radio network 130 obtains its estimate of the position of the user equipment device 110 without recourse to the messages 470 and 480, and includes the estimate so obtained in the position response message 490.

The access point 122 may simply assume that it is collocated with the user equipment device (e.g., the device 110) whose position estimate it obtains at the time (or close to the time) it is communicating with the user equipment device. The access point 122 may then store the position estimate and provide it when necessary, for example, whenever geographic location of the source of a call connected through the WLAN 120 is requested. The error in this position estimate is bounded by the size of the WLAN service area. This size can be relatively small. The service range of 802.11b/g, for instance, is often estimated at 100 meters. In practice, the service range is often found to be even shorter, due to imperfect environments for signal propagation.

This level of positioning error may be adequate for many location-sensitive services, such as location-targeted advertising, but it may be unacceptable for other services. For example, locating the source of an emergency call in an environment with closely packed residences may require more accuracy in the position estimate of the access point. Further, future WLAN standards (e.g., 802.11n) are expected to offer somewhat greater ranges, and schemes external to the actual WLAN standard (e.g., repeaters and switches) can substantially extend the effective coverage area of the WLAN, in some cases into the kilometer range. The positioning error would then increase accordingly. Therefore, it may be beneficial to enhance the accuracy of the estimated position of the access point. We proceed to describe several techniques of improving the accuracy of access point position estimates based on the position estimates of user equipment devices.

In accordance with averaging techniques, the access point obtains multiple user equipment device position estimates, and averages them to approximate its own position. The access point may request user equipment device position estimates independently from several user equipment devices. We will refer to this averaging technique as "UE diversity averaging." The access point may also request several user equipment device position estimates for the same mobile user equipment device, but associated with different times, to allow the user equipment device to travel throughout the WLAN's service (coverage) area. We will refer to this averaging method as "time diversity averaging." The access point may also combine the UE and time diversity averaging, so that a plurality of user equipment devices are used, and at least one of the user equipment devices provides, at different times, a plurality of its position estimates. We will refer to this averaging method as the "combined UE/time diversity averaging."

Figure 5A:
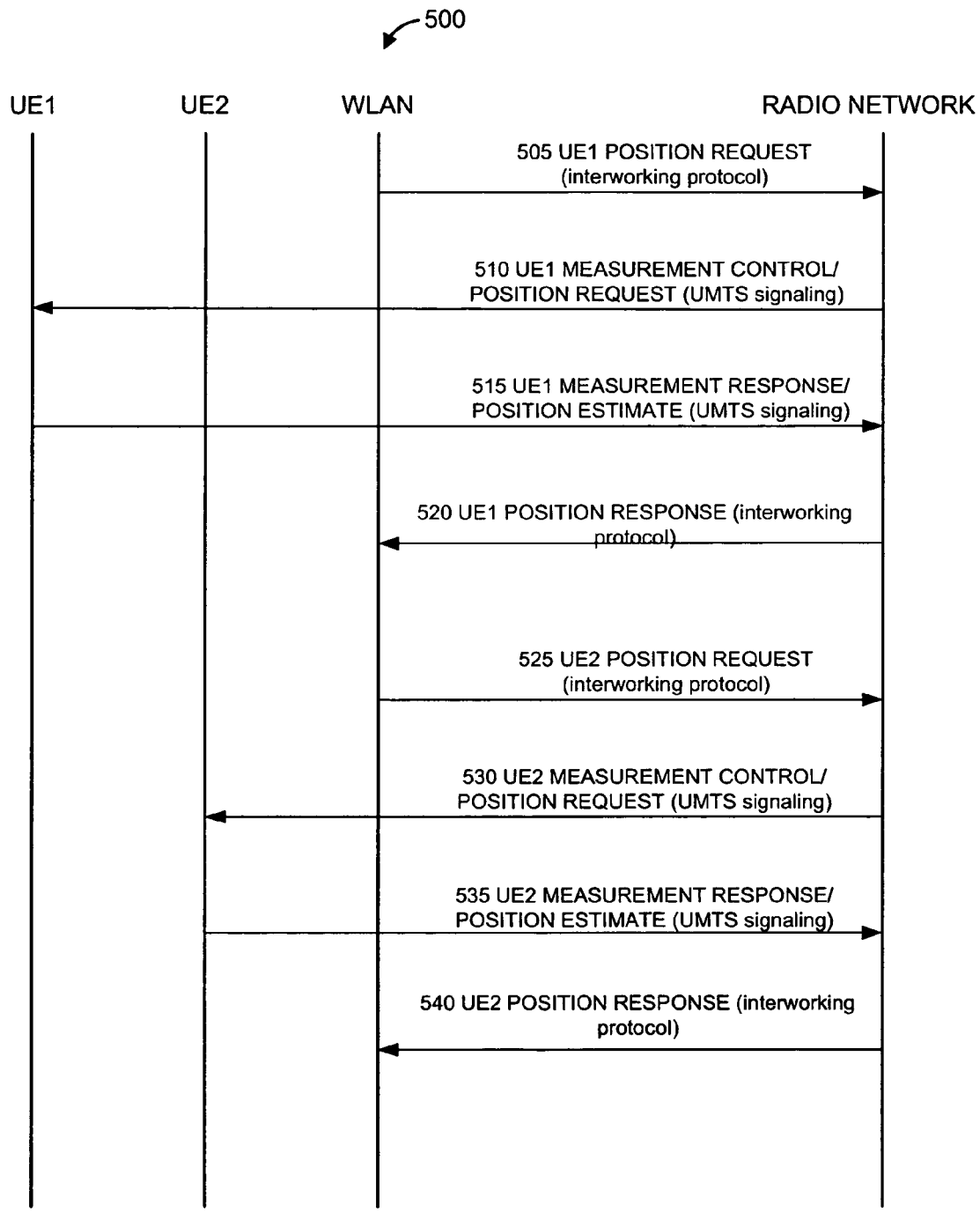
FIG. 5A is a diagram illustrating an exchange of selected messages through which an access point may obtain user equipment position data for estimating the access point's position, in accordance with an embodiment of the present invention.

FIG. 5A shows an exchange 500 of selected messages to enable a WLAN access point to compute and store its position estimate using UE diversity averaging. This exchange involves two different user equipment devices, UE1 and UE2, and for each of the devices is the same as (or substantially similar to) the exchange 450 shown in FIG. 4B. In the course of the message exchange 500, the WLAN access point sends a UE1 position request message 505 to the radio network using an interworking protocol. The radio network receives the UE1 position request message 505, and sends a UE1 measurement control message 510 to the user equipment device UE1 via the radio network air interface. The user equipment device UE1 receives the message 510 and, in response, sends a UE1 measurement response message 515 to the radio network via the air interface. The UE1 measurement response message 515 includes a position estimate of the user equipment device UE1. The user equipment device UE1 may estimate its position in response to the receipt of the message 505, or it may respond with a previously-obtained and stored position estimate. Note that the stored estimate should have been obtained relatively recently, for example, while the UE1 was, in the service area of the access point. The radio network sends back to the WLAN access point a position response message 520, which includes the position estimate of UE1. This process is then repeated with the user equipment device UE2, using the messages 525, 530, 535, and 540.

Note that the UE2 position request message 525 may be sent before the UE1 position response message 520 is received. For example, the access point may send the messages 505 and 525 at about the same time, and then await the position response messages 520 and 540. Furthermore, a single broadcast or multicast measurement control message from the radio network may contain requests for position estimates of multiple user equipment devices.

It should also be understood that averaging is not limited to two user equipment devices.

Once the access point obtains the position responses with position estimates of two or more user equipment devices, it averages out the position estimates to obtain an improved estimate of its own geographic location, and stores this latter estimate for future use, for example, for providing the geographic location to 911 emergency operators.

Figure 5B:
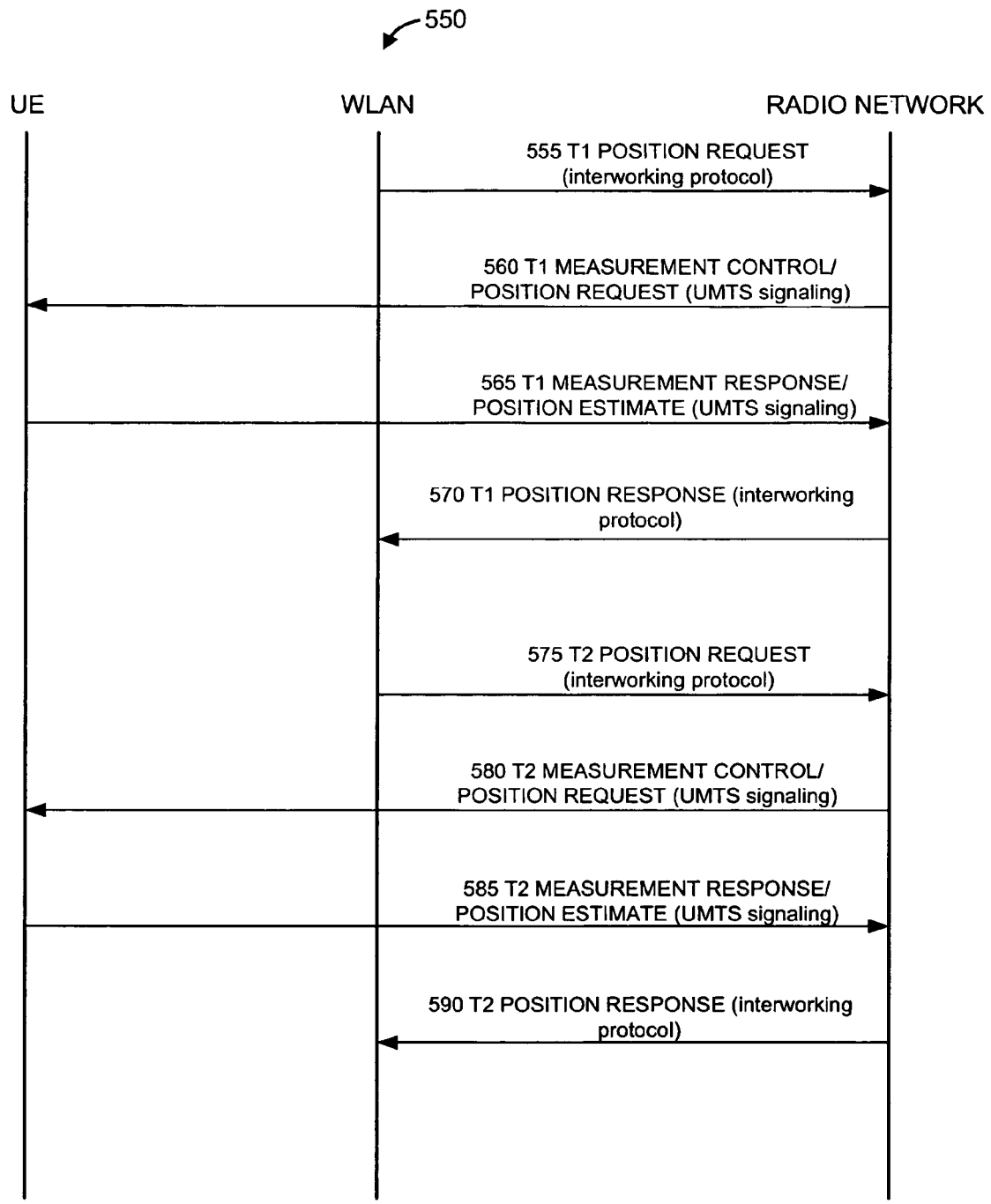
FIG. 5B is a diagram illustrating another exchange of selected messages through which an access point may obtain user equipment position data for estimating the access point's position, in accordance with an embodiment of the present invention.

FIG. 5B shows an exchange 550 of selected messages to enable a WLAN access point to obtain and store its position estimate using time diversity averaging. The message exchange 550 is similar to the exchange 500, with the major difference being that the position request messages are sent to, and position request responses are received from, the same user equipment device, but at different points in time. The time difference between the two position responses is such that the user equipment device is likely to have moved a non-trivial distance during the interval between the two measurements, i.e., a distance of at least ten meters or a distance that constitutes a relatively large portion (e.g., at least ten percent) of the longest dimension of the coverage area of the access point. For example, the time difference may be at least one minute, at least ten minutes, at least one hour, or at least one day.

Another technique for improving the position estimate of the access point is for the access point to measure round-trip time (RTT) between the access point and the user equipment device or devices. With three RTT measurements, either for different user equipment devices or for a single moving user equipment device, the access point can trilaterate on its own position. It is also possible to use this technique with a combination of multiple user equipment devices and multiple measurements from one of the user equipment devices. For example, two position measurements may be obtained from a first moving user equipment device, and a third position measurement may be obtained from a second user equipment device. Note that one user equipment device may be as good as another in this respect; that is, three measurements taken at different times from a single user equipment device may serve as well as measurements from three different user equipment devices, provided the single user equipment device actually moves between the measurements.

Figure 6A:
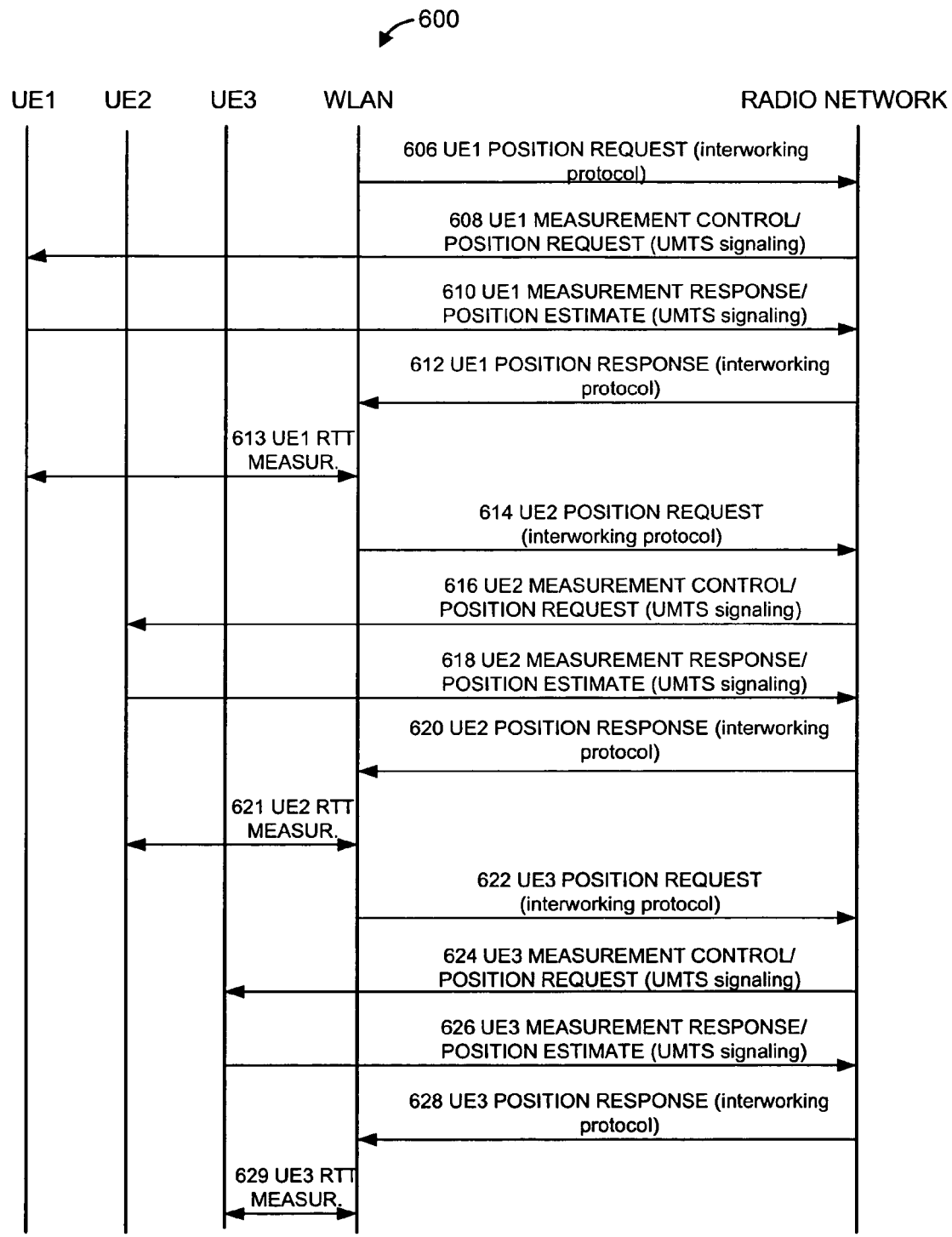
FIG. 6A is a diagram illustrating an exchange of selected messages through which an access point may obtain user equipment position and round-trip times data for estimating the access point's position, in accordance with an embodiment of the present invention.

FIG. 6A shows an exchange 600 of selected messages to enable a WLAN access point to obtain and store its position estimate using RTT data and trilateration. This exchange is similar to the exchanges 450 and 500 of FIGS. 4B and 5A, but it involves three user equipment devices, UE1 through UE3, as well as additional messages for measuring RTTs. Here, the access point again is presumed to request each user equipment device position from the radio network as a separate transaction. In particular, the access point sends to the radio network three position request messages, 606, 614, and 622. Each of these messages is related to a different user equipment device. In response to each of the position request messages, the radio network sends to the respective user equipment device a measurement control message: measurement control message 608 is sent to UE1, measurement control message 616 is sent to UE2, and measurement control message 624 is sent to UE3.

After each user equipment device receives the measurement control message sent to it, it sends back to the radio network a measurement response message containing an estimate of its position: UE1 sends a measurement response message 610, UE2 sends a measurement response message 618, and UE3 sends a measurement response message 626. When the radio network receives each of the UE position estimates, it sends a corresponding position response message to the access point: position response message 612 carries the position estimate of UE1, position response message 620 carries the position estimate of UE2, and position response message 628 carries the position estimate of UE3.

The access point receives each of the position response messages, and measures the round-trip time between itself and the corresponding user equipment device that provided the position estimate, by exchanging RTT-measuring messages with the device: the access point exchanges (1) RTT-measuring messages 613 to measure the round-trip time between itself and UE2, (2) RTT-measuring messages 621 to measure the round-trip time between itself and UE2, and (3) RTT-measuring messages 629 to measure the round-trip time between itself and UE3. Each of the RTT-measuring messages is preferably sent within a short time (e.g., as soon as possible, or as the next message from the access point) upon receipt of the corresponding position response message from the radio network. In this way, the position response for the user equipment device contains the device's position estimate obtained substantially at the same time as the RTT measurement for the same user equipment device.

From the RTTs the access point computes distances between itself and each of the user equipment devices. Given the three distances and the corresponding positions of the user equipment devices, the access point can estimate its own position by trilateration. The access point stores this estimate of its position for future use, for example, for providing its geographic location to 911 emergency operators.

It should be understood that in the message exchange 600, the UE2 position request message 614 may be sent before the UE1 position response message 612 is received, and that the UE3 position request message 622 may be sent before the UE2 position response message 620 is received. For example, the access point may send the messages 606, 614, and 622 at about the same time, and then await the position response messages 612, 620, and 628. Furthermore, a single position request message may contain requests for position estimates of two or more user equipment devices.

Figure 6B:
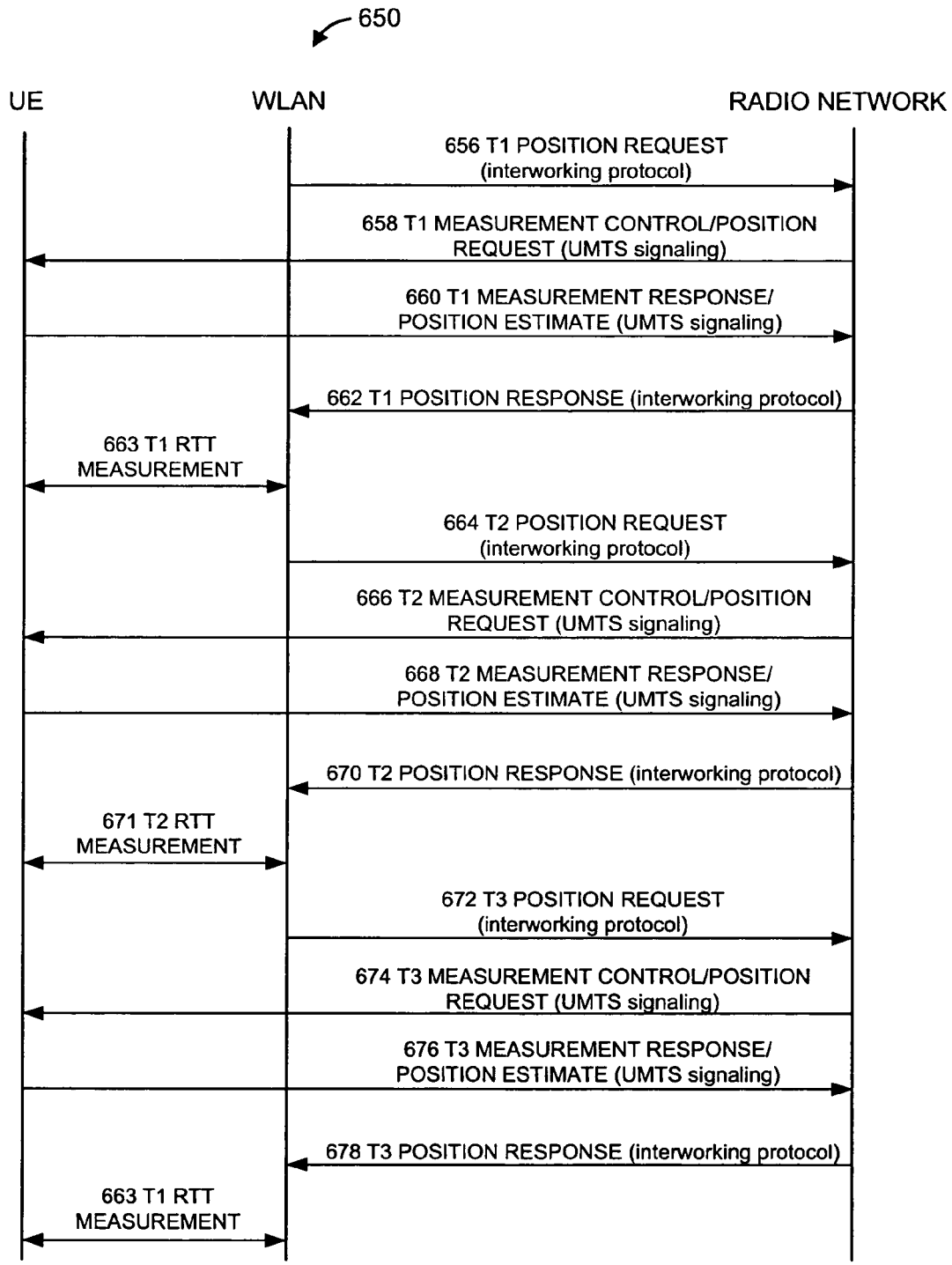
FIG. 6B is a diagram illustrating another exchange of selected messages through which an access point may obtain user equipment position and round-trip times data for estimating the access point's position, in accordance with an embodiment of the present invention.

FIG. 6B shows an exchange 650 of selected messages to enable a WLAN access point to obtain and store its position estimate using RTT data and trilateration from a single user equipment device. This exchange is quite similar to the exchange 600, but the three position request messages are sent to, and the three corresponding position response messages are received from, the same mobile user equipment device, which is located at different places in the access point's service area at the time of each UE position estimate. The time difference between successive position response messages is such that the user equipment device is likely to have moved a non-trivial distance between two successive measurements. For example, the time difference may be at least one minute, at least ten minutes, at least one hour, or at least one day.

After the access point receives each of the three position estimates from the same user equipment device, it measures the RTT to the user equipment device. In some embodiments, the access point proceeds to measure the RTT for the respective user equipment device at substantially the same time as it sends the position request message for the same device, or within a relatively short time of receiving the position response relating to the same user equipment device. In this way, the position response for the user equipment device contains the device's position estimate obtained substantially at the same time as the corresponding RTT measurement for the user equipment device.

When the access point has the three position estimates and the three associated RTT measurements, the access point computes the estimate of its own position by trilateration, and stores the estimate of its position for future use.

Averaging may be used to enhance further the precision of the access point position estimate computed with RTT measurements. That is, message exchanges 600 and 650 may be repeated, and then averaged over time to compensate for initial measurement errors. The averaging may be performed using the same user equipment device or set of user equipment devices, or different device or sets of user equipment devices. For example, the estimate obtained from three different user equipment devices and corresponding RTT measurements (as in FIG. 6A) may be obtained first, and then a second estimate may be obtained using three position measurements and corresponding RTT measurements from a single user equipment device (as in FIG. 6B), and the two estimates may be averaged to obtain a more precise estimate of the position of the access point. Similarly, a first position estimate of an access point obtained from a first set of three user equipment devices may be averaged with a second position estimate of the access point obtained from a second set of three user equipment devices. Some or even all of the user equipment devices in the two sets may be the same, or each of the two sets may include all different devices. More than two estimates of the position of the access point may be averaged.

Averaging of access point position estimates obtained using RTT and trilateration helps to reduce the potential skewing influences of pure time-averaging of user equipment positions. Of course, any time-averaging scheme is subject to undetectable error if the access point moves between measurements; thus it is desirable for measurements to be taken reasonably close together in time. Furthermore, if two access point position estimates differ by more than a predetermined distance, it may be concluded with reasonable certainty that the access point has been moved. In this case, the access point may store the latest position estimate (disregarding earlier access point position estimates), or the access point may invalidate the stored position estimate and initiate a new set of position measurements. The predetermined distance that triggers such action may be set to be greater than any realistically feasible measurement error in the process of estimating the access point position. For example, the predetermined distance may be set to be greater than the longest dimension of the access point's service area.

Note that the accuracy of the methods that rely on both the user equipment position measurements and the RTT measurements are sensitive to the delay between the times of the position measurement and the corresponding RTT measurement, because the UE may move some distance between the times of the two measurements. It is therefore desirable that the two measurements be as closely synchronized as possible.

The methods discussed so far may be viewed as hosted on the WLAN access point, because the responsibility for computing the access point location from available data rests with the access point. As a consequence, in addition to the generalized support for the interworking interface to radio network, the access point also includes software configured to perform various other steps, such as averaging computations. Because access point software may not be uniform or easily upgradable, it may be desirable instead to have the final computation hosted on the radio network.

In embodiments consistent with the radio network-hosted approach, the interworking interface between the WLAN and the radio network includes provisions for the access point to request its own position from the radio network. The radio network has the same positioning options open to it as are described above in relation to the WLAN-hosted methods.

In the first and simplest case described above (in which the access point assumes itself to be collocated with any given user equipment device in its service area), the change from access point to radio network hosting of the positioning computation makes little difference, because the access point requests a single user equipment device position from the radio network, as shown in FIG. 4A. The choice of hosting of the final position computation becomes more significant when the accuracy of the access point position estimate is enhanced through averaging and/or RTT measurement techniques.

In embodiments implementing the radio network-hosted version of access point position estimating with averaging, the access point issues to the radio network a position request. The radio network is then responsible for determining a plurality of user equipment device positions in the service area of the WLAN access point, and averaging these positions to yield an estimated access point position. As in the case of similar WLAN-hosted position computations, the averaging method may be a UE diversity method, time diversity method, or combined UE/time diversity method.

Figure 7A:
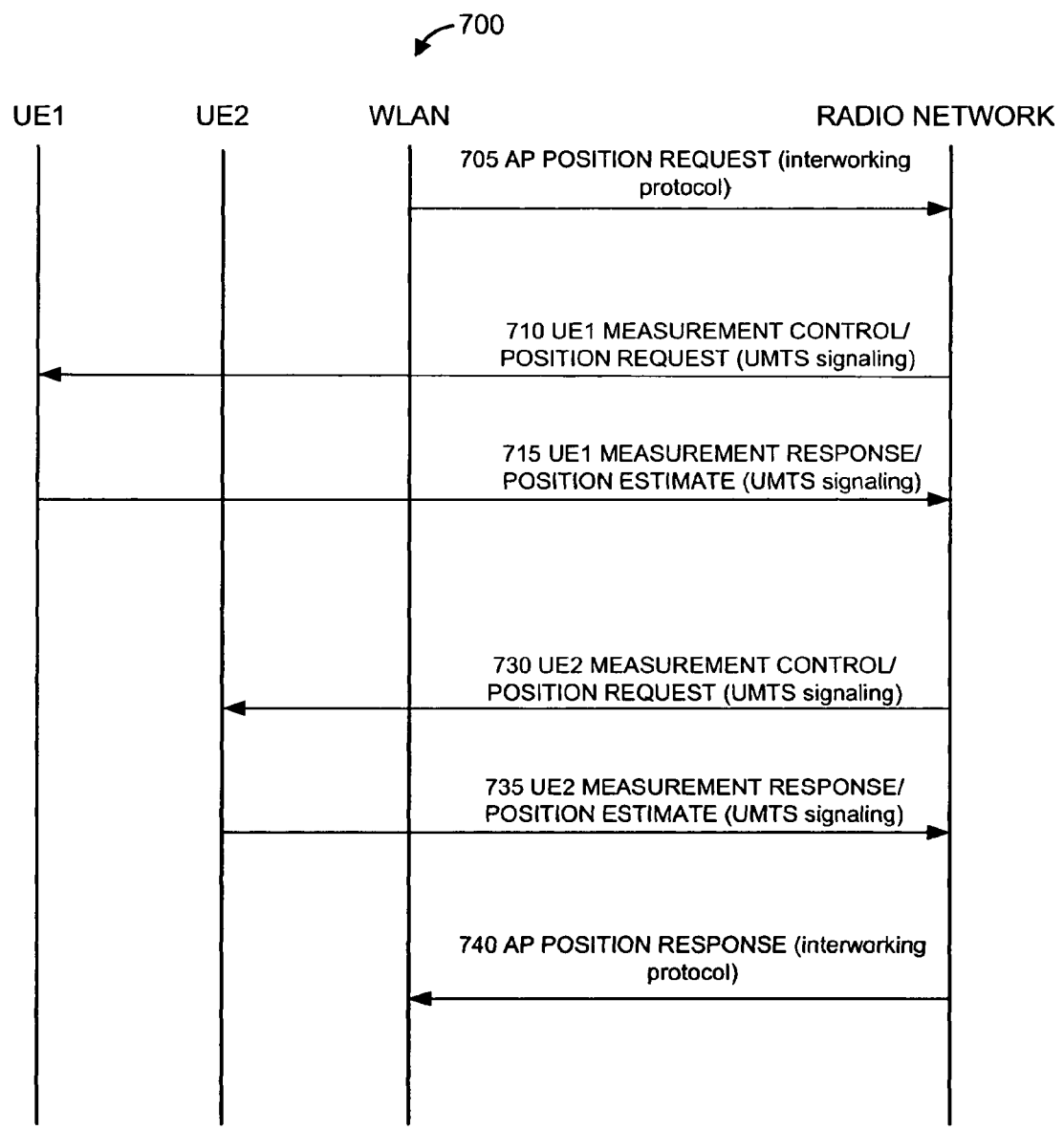
FIG. 7A is a diagram illustrating an exchange of selected messages through which an access point may obtain an estimate of its position computed at a radio network based on user equipment device position data, in accordance with an embodiment of the present invention.

FIG. 7A shows an exchange 700 of selected messages in accordance with a radio network-hosted method with UE diversity averaging. This exchange involves two different user equipment devices, UE1 and UE2. In the course of the message exchange 700, the WLAN access point sends a position request message 705 to the radio network using an interworking protocol. The message 705 requests the position estimate of the access point. The radio network receives the message 705 and sends a measurement control message 710 to a user equipment device UE1 via the radio network air interface. The user equipment device UE1 receives the message 710 and, in response, sends a measurement response message 715 to the radio network via the air interface. The measurement response message 715 includes a position estimate of the user equipment device UE1. The user equipment device UE1 may estimate its position in response to the receipt of the message 710, or it may respond with a previously-obtained position estimate, in accordance with the position-location procedures generally used to locate UEs in the radio network. The radio network also sends a measurement control message 730 to a second user equipment device UE2 via the radio network air interface. The user equipment device UE2 receives the message 730 and, in response, sends a measurement response message 735 to the radio network via the air interface. The measurement response message 735 includes a position estimate of the user equipment device UE2. The user equipment device UE2 may estimate its position in response to the receipt of the message 730, or it may respond with a previously-obtained position estimate, in accordance with the position-location procedures generally used to locate UEs in the radio network. Note that if previously-obtained and stored estimates are used, these estimates should have been obtained relatively recently, while the respective user equipment device was in the service area of the access point.

Once the radio network (e.g., the radio network controller of the radio network) obtains the position responses with position estimates of UE1 and UE2 user equipment devices, it averages the position estimates of the user equipment devices to obtain an estimate of the position of the access point. The radio network then sends the position estimate of the access point to the access point in a position response message 740. The access point stores this estimate for future use, for example, for providing its position to 911 emergency operators.

The message 730 may be sent before, after, or substantially at the same time as the message 710. Furthermore, a single broadcast or multicast position request message may contain requests for position estimates of multiple devices.

It should also be understood that averaging is not limited to two user equipment devices.

Figure 7B:
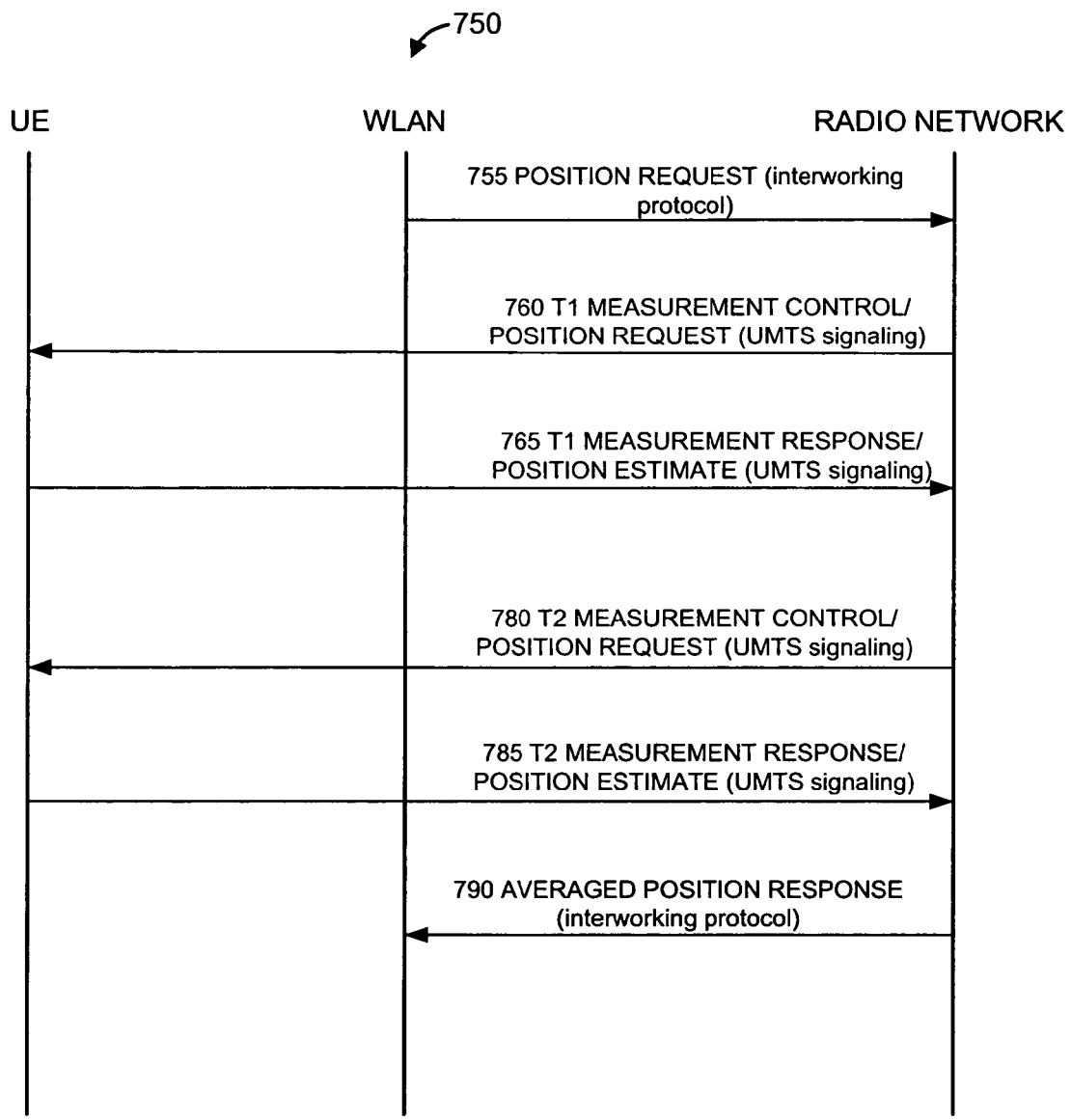
FIG. 7B is a diagram illustrating another exchange of selected messages through which an access point may obtain an estimate of its position computed at a radio network based on user equipment device position data, in accordance with an embodiment of the present invention.

FIG. 7B shows an exchange 750 of selected messages in accordance with a radio network-hosted method with time diversity. This exchange involves a single user equipment device. In the course of the message exchange 750, the WLAN access point sends a position request message 755 to the radio network using an interworking protocol. The message 755 requests the position estimate of the access point. The radio network receives the message 755 and sends a measurement control message 760 to the user equipment device via the radio network air interface. The user equipment device receives the message 760 and, in response, sends a measurement response message 765 to the radio network via the air interface. The measurement response message 765 includes a position estimate of the user equipment device at a time T1 when the user equipment device was in the service area of the access point. The radio network also sends a measurement control message 780 to the user equipment device via the radio network air interface. The user equipment device receives the message 780 and, in response, sends a measurement response message 785 to the radio network via the air interface. The measurement response message 785 includes a position estimate of the user equipment device at a time T2 when the user equipment device was in the service area of the access point. The user equipment device estimates of its own position in the messages 765 and 785 should be diverse in time and, consequently, in space. The time difference between the two position estimates may be such that the user equipment device is likely to have moved a non-trivial distance between the two estimates. For example, the time difference may be at least one minute, at least ten minutes, at least one hour, or at least one day.

Once the radio network (e.g., the radio network controller of the radio network) obtains the position responses with position estimates of the user equipment device, it averages the position estimates of the user equipment device to obtain an estimate of the position of the access point. The radio network then sends the position estimate of the access point to the access point in a position response message 790. The access point stores this estimate for future use, for example, for providing its geographic location to 911 emergency operators.

It should also be understood that time averaging is not limited to averaging two position estimates.

The radio network-hosted approach may also employ the combined UE/time diversity averaging method, in accordance with which the radio network computes the estimate of the access point position by averaging (1) a plurality of position estimates of one user equipment device with (2) at least one position estimate of at least one other user equipment device.

The methods for estimating the access point location by obtaining user equipment device positions and associated RTT measurements followed by trilateration can also be hosted by the radio network. Here, the interworking interface may provide a means for the radio network to request from the WLAN an RTT measurement from the access point to a particular user equipment device. In accordance with this approach, the radio network determines user equipment device position and requests an RTT measurement from the WLAN for the corresponding user equipment device. The radio network may do this successively for several user equipment devices.

Figure 8A:
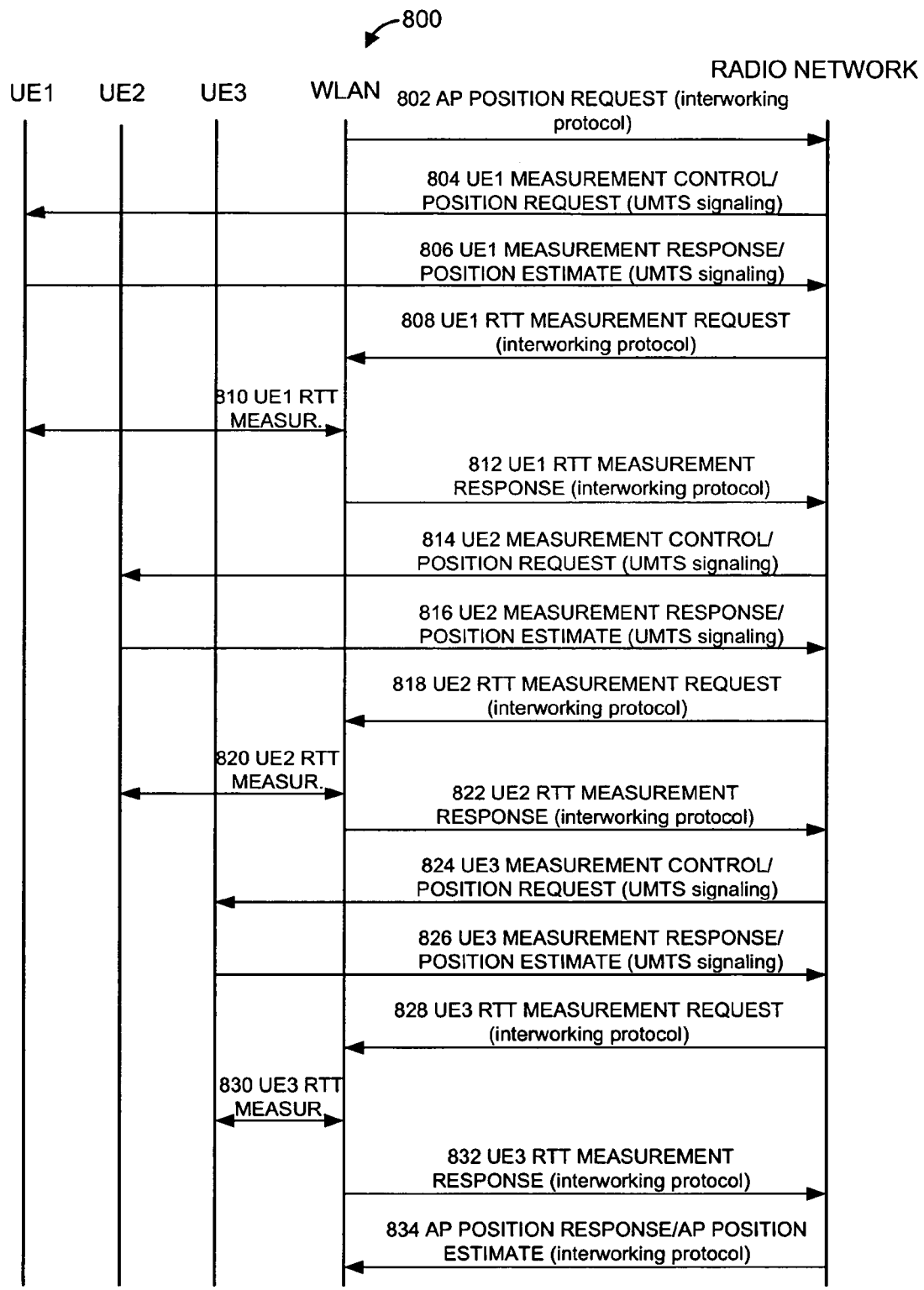
FIG. 8A is a diagram illustrating an exchange of selected messages through which an access point may obtain an estimate of its position computed at a radio network based on user equipment device position and round-trip time data, in accordance with an embodiment of the present invention.

FIG. 8A shows an exchange 800 of selected messages in accordance with one such method. In the course of the message exchange 800, the access point sends an AP position request message 802 to the radio network (e.g., to the radio network controller). To obtain the raw data for computing the access point position, the radio network sends a measurement control message 804 to user equipment device UE1. The message 804 includes a request for the position estimate of UE1. The UE1 responds to the message 804 with a measurement response message 806, which includes an estimate of the position of UE1. The radio network sends a UE1 RTT measurement request message 808 to the WLAN, which requests the WLAN to provide to the radio network the round-trip time between the access point and UE1. To measure the round-trip time to UE1, the access point of the WLAN carries out an RTT measurement procedure 810 with UE1. The WLAN then sends the measured UE1 RTT to the radio network in UE1 RTT measurement response message 812. Note that here, as in other methods using RTTs described throughout this document, the RTT should be measured close in time to the point when the associated UE's position (UE1 position) is measured, so that the device has not moved a substantial distance between the times its RTT and position are measured.

Through a similar process that employs messages 814, 816, 818, 820, and 822, the radio network obtains position estimate and RTT for UE2; through another similar process that employs messages 824, 826, 828, 830, and 832, the radio network obtains position estimate and RTT measurement for UE3. After the radio network has the three position estimates and the corresponding RTT measurements for UE1, UE2, and UE3, the radio network (e.g., the RNC) computes an estimate of the access point position by trilateration, and sends the estimate to the WLAN access point via AP position response message 834. Averaging may be used to improve the access point position estimate.

Figure 8B:
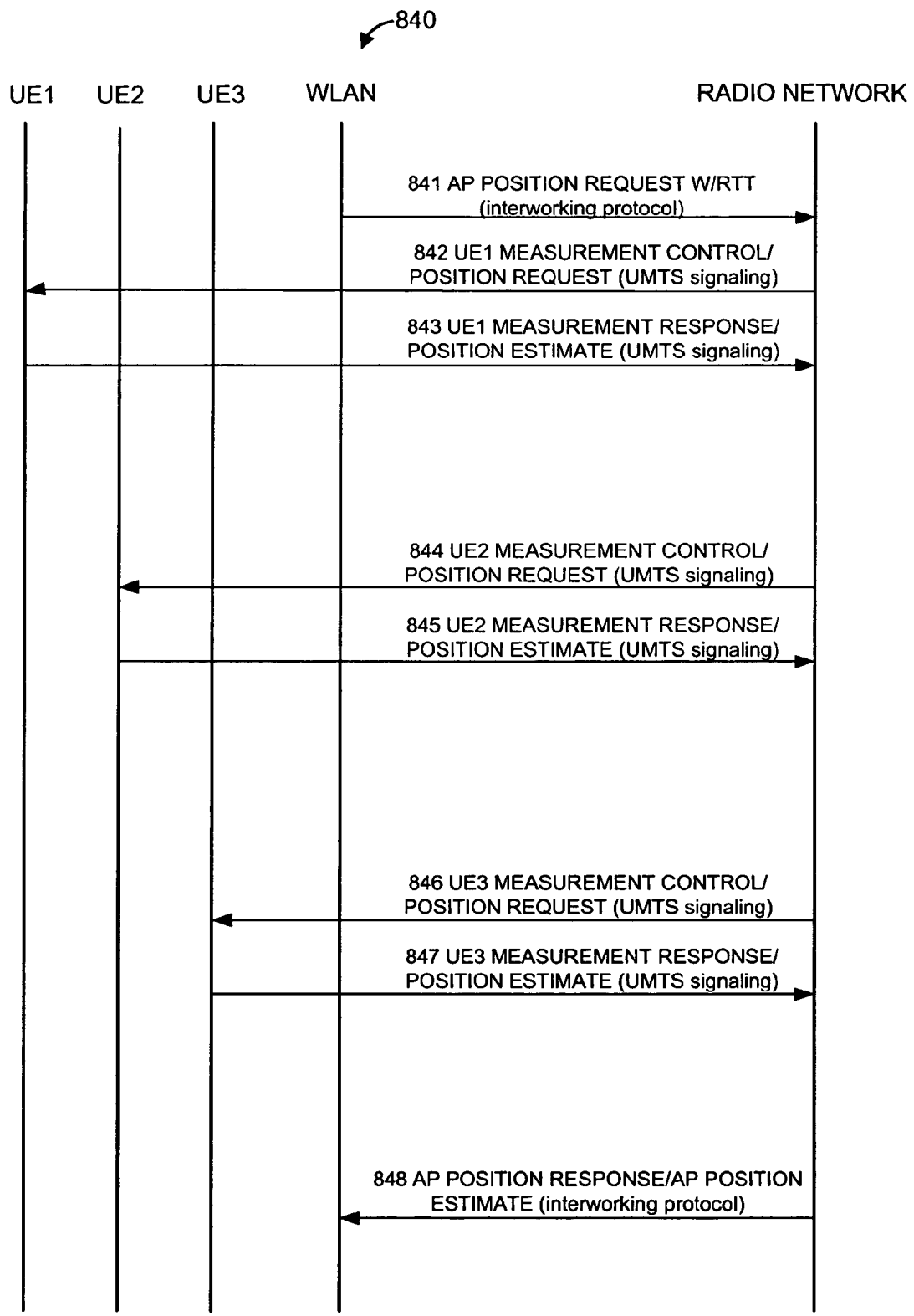
FIG. 8B is a diagram illustrating another exchange of selected messages through which an access point may obtain an estimate of its position computed at a radio network based on user equipment device position and round-trip time data, in accordance with an embodiment of the present invention.

In some alternative embodiments, the WLAN provides to the radio network a list of RTT measurements along with the initial position request, thus eliminating the need for the interworking protocol to support a separate RTT measurement request. This simplification, however, may affect the accuracy of the resulting position estimate, because of the delay between the RTT measurements and the position estimate measurements of the user equipment devices. The level of accuracy is dependent on the velocity of the user equipment devices and the delay between measurements. If velocity measurements for the user equipment devices are available to the radio network (e.g., through Location Services), the accuracy of this method may be improved by propagating the estimated positions backwards to obtain approximate user equipment device positions at the time of the RTT measurements. FIG. 8B shows an exchange 840 of selected messages in accordance with this method.

Figure 8C:
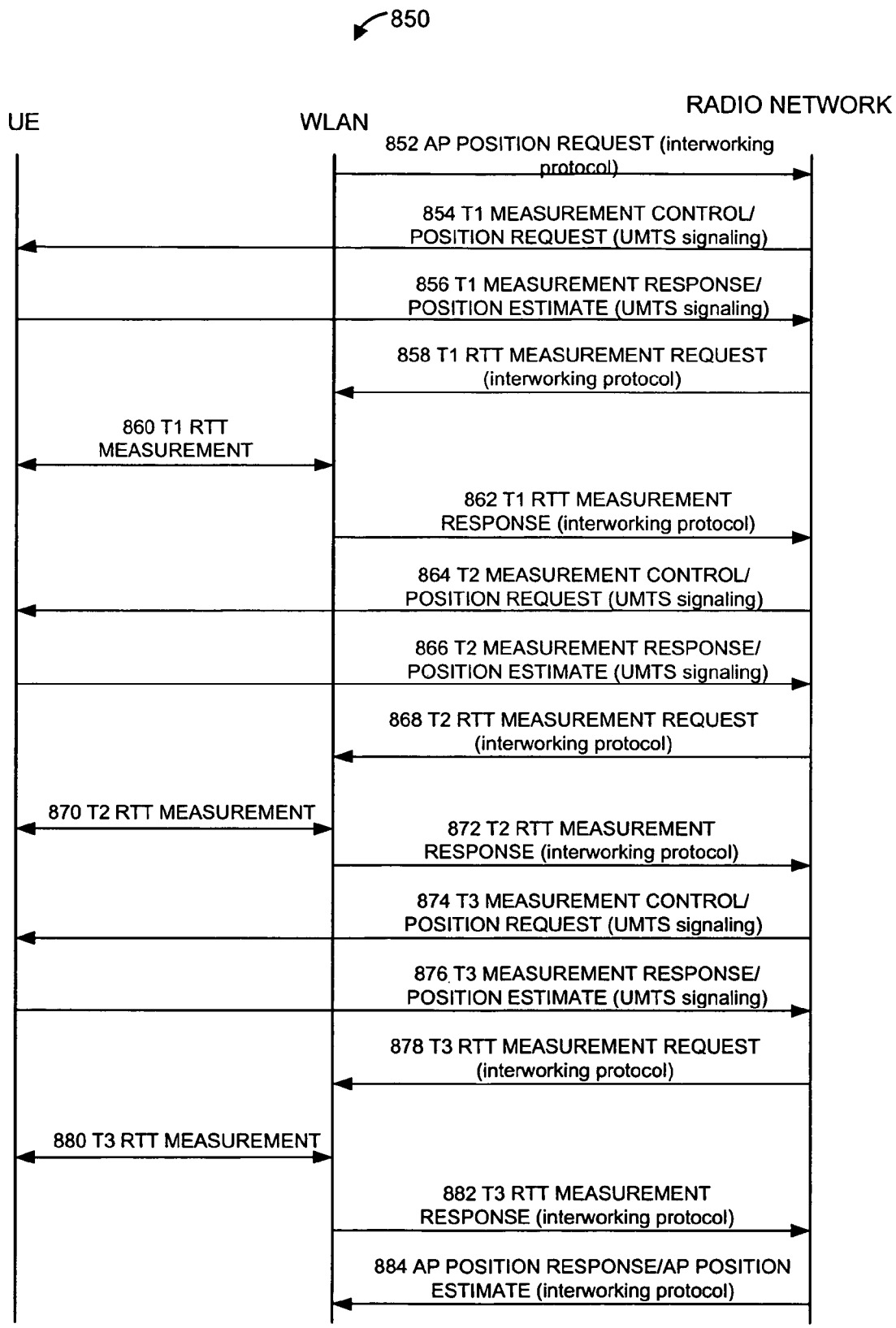
FIG. 8C is a diagram illustrating another exchange of selected messages through which an access point may obtain an estimate of its position computed at a radio network based on user equipment device position and round-trip time data, in accordance with an embodiment of the present invention.

As in the case of WLAN-hosted computation, the radio network-hosted method with RTT measurements and trilateration can use a time-diversity approach with a single moving user equipment device. FIG. 8C shows an exchange 850 of selected messages for radio network-hosted embodiment in accordance with one such method. In the course of the message exchange 850, the access point sends an AP position request message 852 to the radio network (e.g., to the radio network controller). The radio network sends a T1 (time point 1) measurement control message 854 to user equipment device. The message 854 includes a request for the position estimate of the user equipment device at T1. The user equipment device responds to the message 854 with a T1 measurement response message 856, which includes an estimate of the position of the user equipment device. The radio network also sends a T1 RTT measurement request message 858 to the WLAN, which requests the WLAN to measure the round-trip time between the access point and the user equipment device at or about T1. To perform the requested measurement, the access point of the WLAN exchanges T1 RTT measurement messages 860 with the user equipment device. The WLAN then sends the measured T1 RTT (which corresponds to T1) to the radio network in T1 RTT measurement response message 862.

Through a similar process that employs messages 864, 866, 868, 870, and 872, the radio network obtains position estimate and corresponding RTT for T2 (time point 2); through another similar process that employs messages 874, 876, 878, 880, and 882, the radio network obtains position estimate and corresponding RTT measurement for T3 (time point 3). The time intervals between T1, T2, and T3 are such that the user equipment device is likely to have moved a non-trivial distance during each of the intervals. After the radio network has the three different position estimates and the corresponding RTT measurements for T1, T2, and T3, the radio network (e.g., the RNC) computes an estimate of the access point position by trilateration, and sends the estimate to the WLAN access point via AP position response message 884. Averaging may be used to improve the access point position estimate.

A combination of UE diversity (multiple UEs) and time diversity (multiple measurements involving one of the UEs) techniques may also be used.

The radio network-hosted embodiments that use RTT measurements may employ averaging to enhance the accuracy of the access point position estimate. For example, the message exchanges 800 and/or 850 may be repeated, and the resulting multiple AP position estimates averaged to reduce the effect of individual measurement errors. The multiple AP position estimates may be obtained using the same user equipment device or set of user equipment devices, or different device or sets of user equipment devices. This is similar to the use of averaging in the WLAN-hosted embodiments using RTT measurements, which have been described above.

As has already been briefly mentioned, the radio network can maintain a database of access point positions autonomously, without explicit a priori requests from the access points. For example, while interworking with a particular WLAN access point, the network can take positioning measurements from various user equipment devices served by that particular access point, and store them in the database 140 for time averaging. In essence, this is the same as the radio network-hosted form of time-averaged positioning, but initiated autonomously rather than in response to a request from the access point. If such a request later arrives, the radio network can respond with its current estimated position for the requesting access point. The database may also store volatility information for the estimates, for example, the largest deviation of the estimate from the current value within an immediately preceding time period of predetermined length, such as one minute.

Figure 9A:
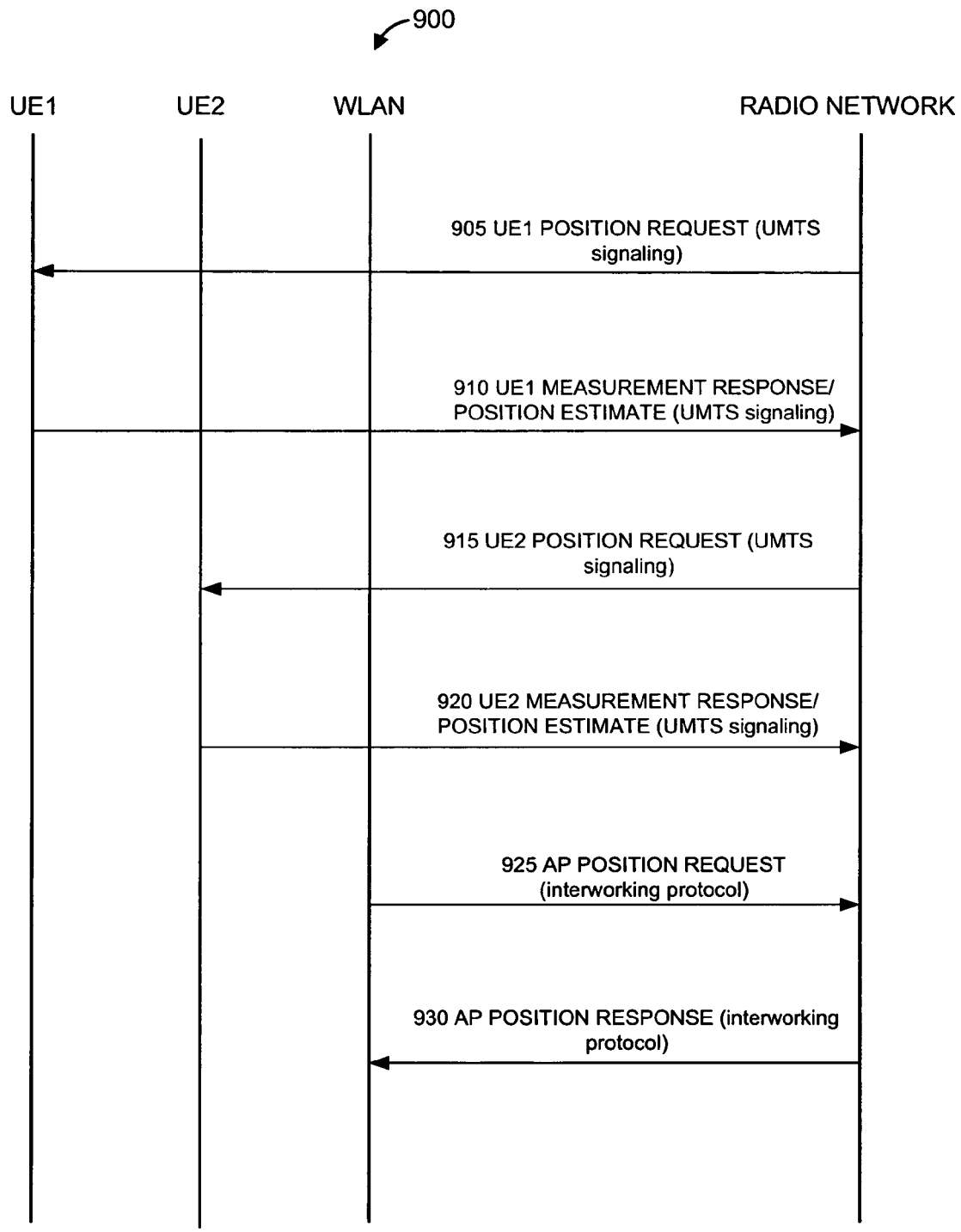
FIG. 9A is a diagram illustrating another exchange of selected messages through which an access point may obtain an estimate of its position computed at a radio network based on user equipment device position data, in accordance with an embodiment of the present invention.

FIG. 9A shows an exchange 900 of selected messages in accordance with one such embodiment. The radio network sends a UE1 position request message 905 to a first user equipment device UE1, which is within the service area of a WLAN access point. The message 905 includes a user equipment device position request for the first user equipment device UE1. The first user equipment device UE1 responds with a measurement response message 910, which includes the estimate of the geographic position of the first user equipment device UE1. The radio network similarly sends a UE position request message 915 to a second user equipment device UE2, with a user equipment device position request for UE2. The user equipment device UE2 is also within the service area of the WLAN access point. The user equipment device UE2 responds with a measurement response message 920, which includes the estimate of the geographic position of UE2. The radio network (e.g., a radio network controller of the radio network) averages the two position estimates (and possibly other user equipment device position estimates), and stores the resulting estimate of the location of the WLAN access point. Subsequently, the WLAN sends a message 925 with a request for position estimate of the access point. The radio network receives the message 925 and responds with an AP position response message 930, which includes the averaged value of the estimate of the access point's position. Note that the radio network can now respond to the AP position request message without waiting for position estimate(s) from one or more user equipment devices.

Figure 9B:
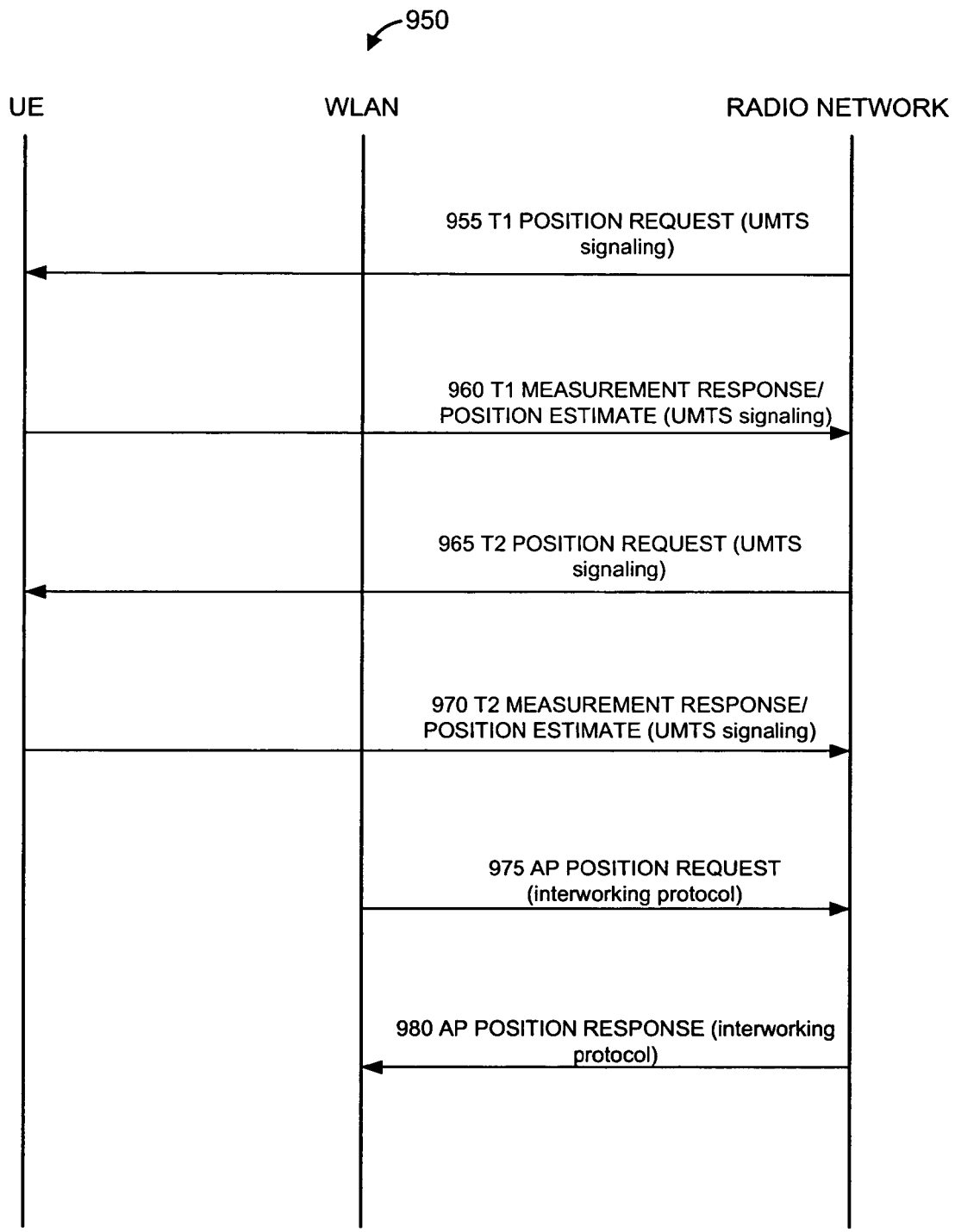
FIG. 9B is a diagram illustrating another exchange of selected messages through which an access point may obtain an estimate of its position computed at a radio network based on user equipment device position data, in accordance with an embodiment of the present invention.

FIG. 9B shows an exchange 950 of selected messages in accordance with another embodiment where the radio network autonomously maintains a database (e.g., the database 140 in FIG. 1) of access point positions. Here, the same mobile user equipment device is used to obtain a plurality of its position measurements while it is in communication with the same access point. The radio network obtains these data without first being requested by the access point. When a request for AP position comes (message 975), the radio network can now respond without waiting for position estimates.

Averaging of multiple positions from the same user equipment device may be combined with averaging position estimates of multiple devices, as was the case in non-autonomous radio network-hosted methods.

The radio network-hosted embodiments that use RTT measurements may also be adapted to become autonomous embodiments. In other words, the radio network may perform RTT methods (as in FIGS. 8A-8C) without the initial AP position requests from the WLAN. Once the WLAN request comes, the radio network may be able to respond with substantially shorter delay.

In the above discussion we assumed that the RTT measurements are made by the WLAN. It is possible, however, to measure RTT from the user equipment devices. Thus, the above methods that rely on RTT measurements can be modified by eliminating the exchange of messages between the radio network and the WLAN for requesting and providing RTT measurements, and adding messages for requesting and receiving RTT measurements from the user equipment devices. The interworking protocol between the WLAN and the radio network can thus be simplified.

Figure 10A:
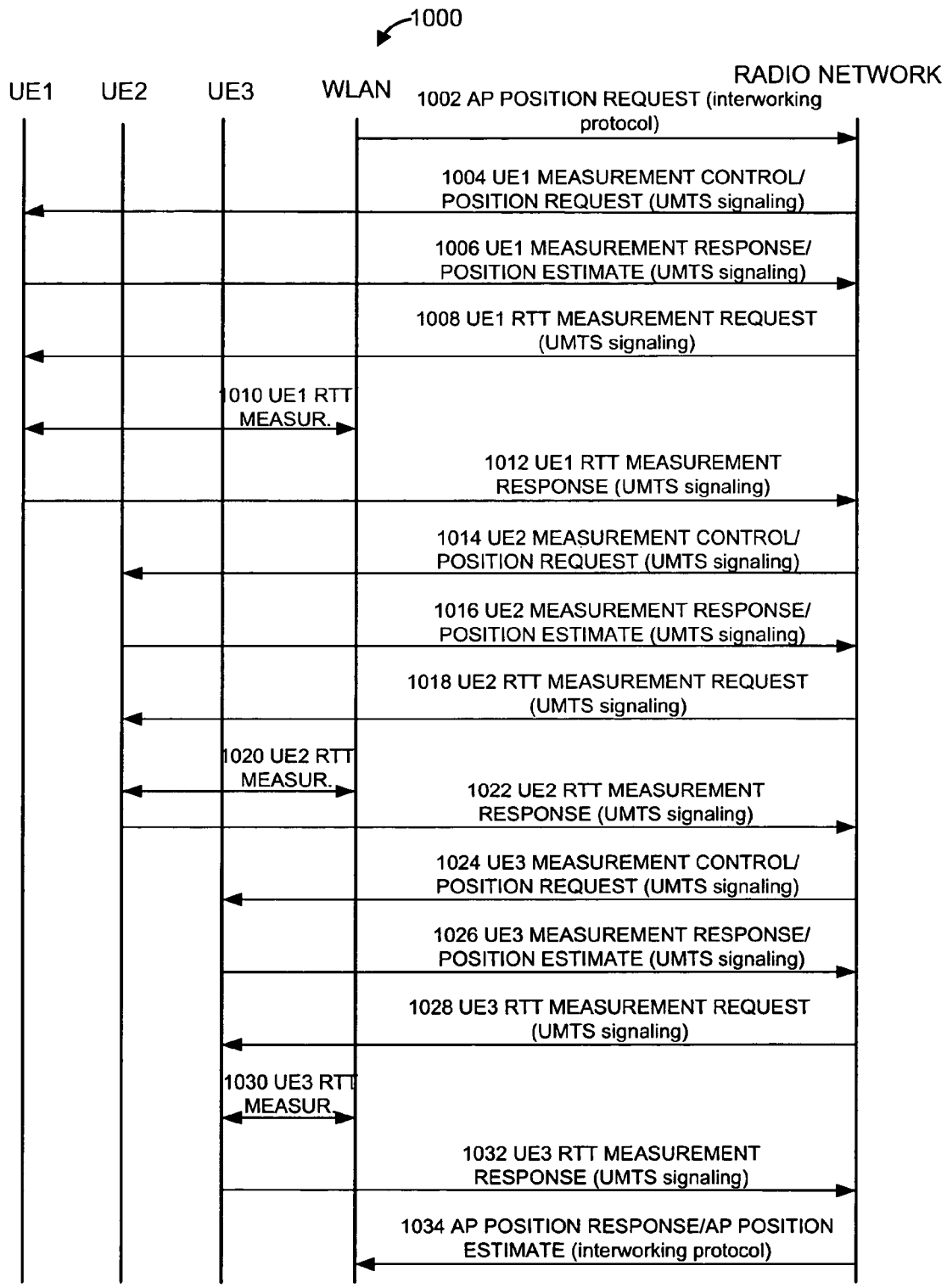
FIG. 10A is a diagram illustrating an exchange of selected messages through which an access point may obtain an estimate of its position computed at a radio network based on user equipment device position and round-trip time data, in accordance with an embodiment of the present invention.
Figure 10B:
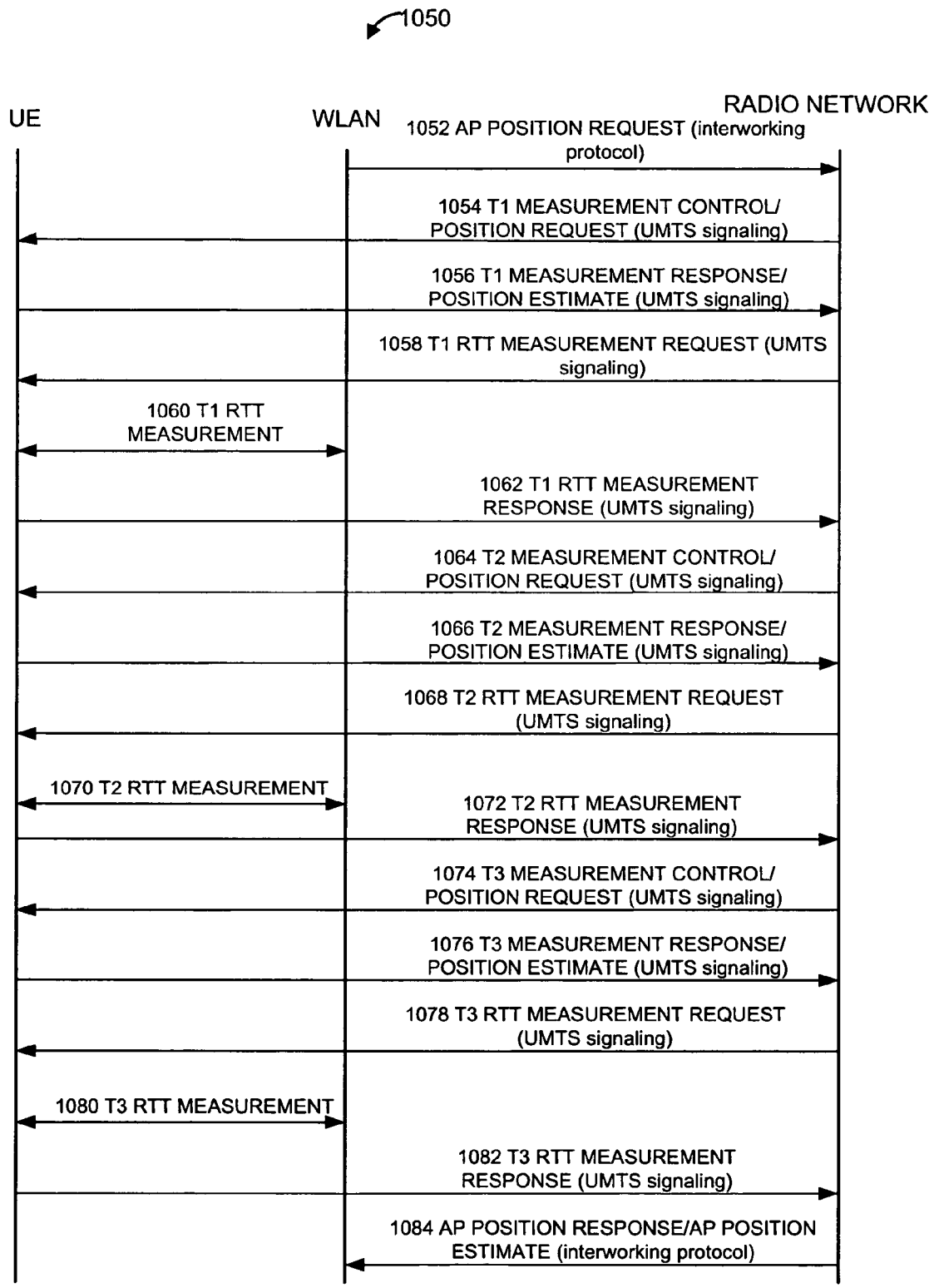
FIG. 10B is a diagram illustrating another exchange of selected messages through which an access point may obtain an estimate of its position computed at a radio network based on user equipment device position and round-trip time data, in accordance with an embodiment of the present invention.

FIG. 10A shows an exchange 1000 of selected messages in accordance with one such radio network-hosted embodiment in which the radio network (e.g., the RNC) trilaterates the access point position from three different user equipment devices. The message exchange 1000 is similar to the message exchange 800 described above, with the exception that the radio network obtains the round-trip times from the user equipment devices, instead of the WLAN. FIG. 10B shows an exchange 1050 of selected messages in accordance with another radio network-hosted embodiment in which the radio network (e.g., the RNC) trilaterates the access point position from three position estimates of the same user equipment device, taken at different times. The message exchange 1050 is similar to the message exchange 850 described above, with the exception that the radio network obtains the round-trip times from the user equipment device, instead of the WLAN.

In some embodiments where RTT is measured by the user equipment device(s), the messages requesting UE position estimate and RTT from the same user equipment device are combined. For example, the messages 1004 and 1008 may be combined into a single message; the messages 1054 and 1058 may also be combined into a single message. Similarly, the messages providing UE position estimates and the corresponding RTT to the radio network may be combined into a single message. For example, the position estimate in the message 1006 may be included in the message 1012; and the position estimate in the message 1056 may be included in the message 1062.

The radio network-hosted embodiments where RTT is measured by the user equipment device(s) may be adapted to autonomous operation by eliminating the need to trigger the exchanges with a request from an access point. When so adapted, the request from the access point for its position estimate may be received by the radio network at any time, for example, after the other messages have been exchanged and the radio network has computed and stored the position estimate for the requesting access point.

Figure 11:
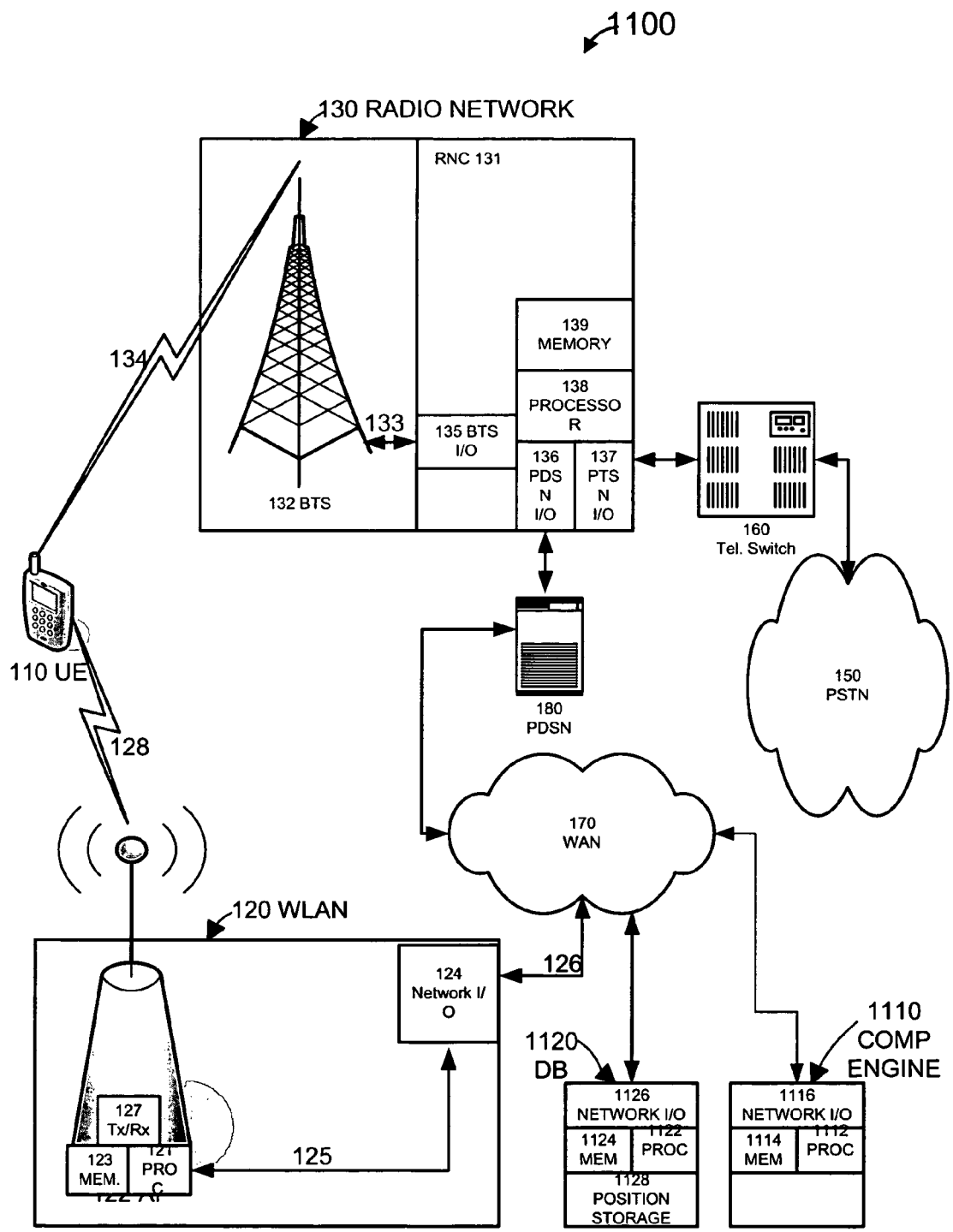
FIG. 11 is a high-level block diagram illustrating selected components of a system that includes a communication network configured in accordance with another embodiment of the present invention.

Still more generally, both the position computation and the database storing position information of various access points may be hosted by separate entities in communication with the radio network and/or the access points. FIG. 11 is a high-level block diagram that illustrates selected components of a combination 1100, which is similar to the combination 100 of FIG. 1, and includes a user equipment device 110, a wireless local area network 120, and a cellular system radio network 130. In addition, FIG. 11 shows a network-based computational engine 1110 and a network-based positional database 1120. Both the computational engine 1110 and the database 1120 may communicate with the radio network 130 and/or the WLAN 120 via the WAN 170. In the embodiment shown in FIG. 11, the computational engine 1110 includes a memory 1114, a network interface 1116, and a processor 1112 that executes the code stored in the memory 1114 and configures the network interface 1116 to send and receive network messages as needed to implement the processes of access point position estimation, storage, and provision. The database 1120 includes a memory 1124, a network interface 1126, position storage (such as a hard drive) 1128, and a processor 1122 that executes the code stored in the memory 1124 and configures the network interface 1126 and the position storage 1128 to send and receive network messages as needed to implement the processes of access point position estimation, storage, and provision. The database 1120 may store position information of a plurality of access points keyed by identifiers of the access points, so that the database 1120 may be queried with access point identifiers to obtain the positions of the access points corresponding to the identifiers used in the queries.

Figure 12:
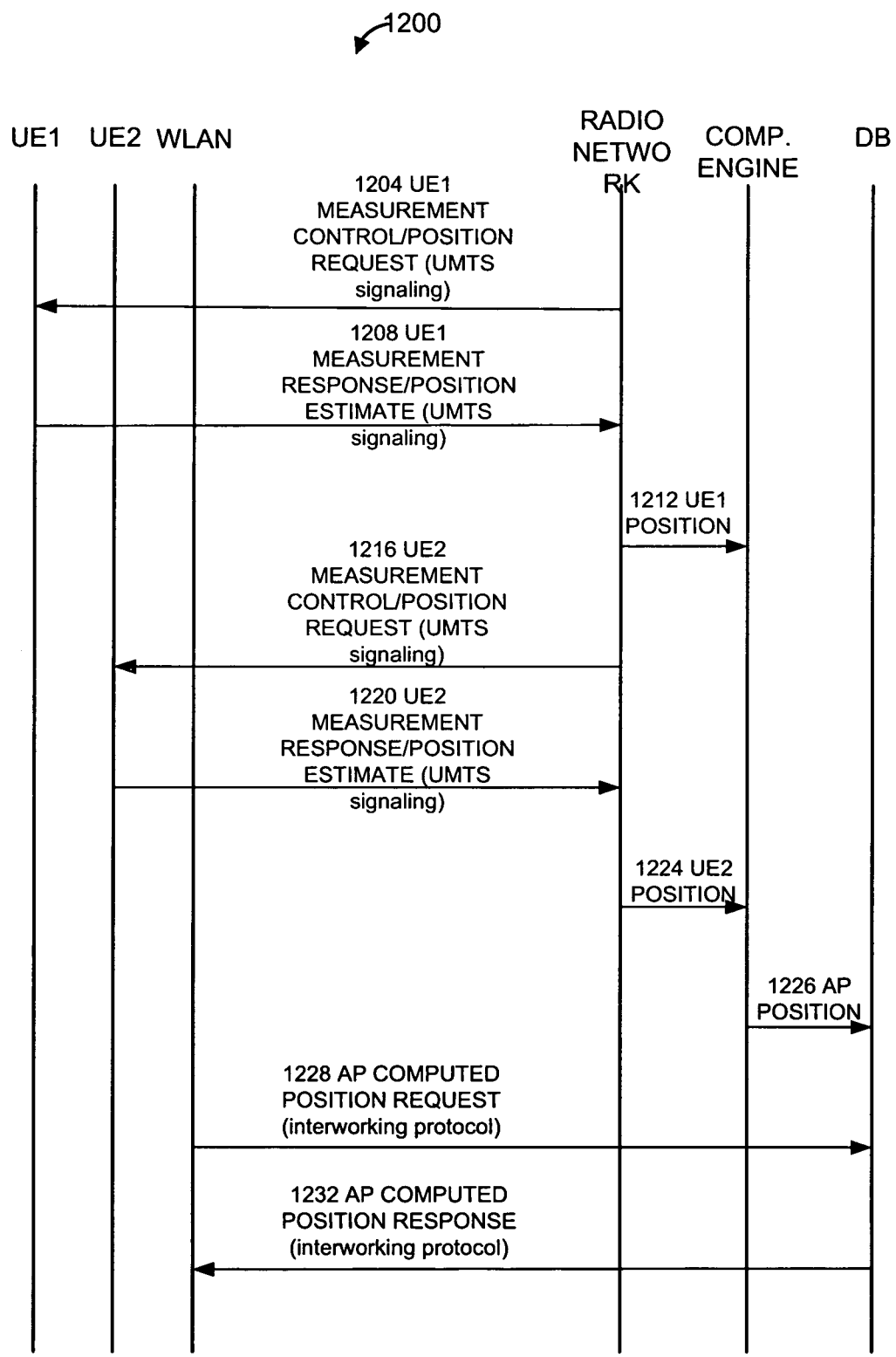
FIG. 12 shows an exchange of selected messages of a method using averaging and separately-hosted database and computational engine.

FIG. 12 shows an exchange 1200 of selected messages of a method using averaging and separately-hosted database and computational engine. In the course of the message exchange 1200, the radio network sends a UE1 position request message 1204 to a UE1. The UE1 responds with its position estimate message 1208, which carries UE1 position information. The radio network receives the position estimate message 1208, and forwards the UE1 position information to the computational engine in a UE1 position message 1212. Similarly, the radio network sends a UE2 position requests message 1216 to a UE2, receives UE2 position information in a position estimate message 1220, and forwards the UE2 position information to the computational engine in a UE2 position message 1224. The computational engine receives the UE1 and UE2 position information and averages the multiple UE positions to generate an AP computed position. The computational engine then sends the AP computed position to the database in an AP position message 1226. It should be noted that the computational engine may generate a new AP computed position with every new UE position received (for a particular access point), or it may do so at predetermined times, or upon receipt of an appropriate command.

When the WLAN needs the position of the access point, it sends an AP computed position request message 1228 to the database. With the AP computed position already stored, the database responds with an AP computed position response message 1232, which carries the computed position of the access point to the WLAN. Note that the database can do so without first requesting additional information from the access point or from the radio network.

The combination 1100 of FIG. 11 may also perform other methods described above in relation to the embodiments where computation and/or database are implemented in the radio network or in the access point. For example, after perusing this document, a person of ordinary skill in the art would be able to modify the message exchange 1200 of FIG. 12 to implement:

(1) UE time diversity averaging (averaging based on position information from the same UE), (2) combined UE and time diversity averaging (averaging based on multiple position measurements from the same UE and from multiple UEs), (3) trilateration based on UE diversity (trilaterating based on multiple position and RTT measurements from different UEs), (4) trilateration based on time diversity (trialteration based on multiple position and RTT measurement pairs from the same UE), and (5) trilateration based on combined UE and time diversity (trilateration based on multiple position/RTT measurement pairs from the same UE combined with a position/RTT measurement pair from a different UE).

Although steps of the various methods (and corresponding messages) have been described serially in this disclosure, some of these steps may be performed by separate elements in conjunction or in parallel, asynchronously or synchronously, in a pipelined manner, or otherwise. There is no particular requirement that the steps be performed in the same order in which this description lists them, except where explicitly so indicated, otherwise made clear from the context, or inherently required. Furthermore, not every illustrated step or communication message is necessarily required in every embodiment in accordance with the invention, while some steps or communication messages that have not been specifically illustrated may be desirable in some embodiments in accordance with the invention. Similarly, there is no particular requirement that the communication messages shown in the diagrams be performed in the strict order illustrated, except where explicitly so indicated, otherwise made clear from the context, or inherently required.

Those of skill in the art would understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill would further appreciate that the various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware, software, or combination of hardware and software depends upon the particular application and design constraints imposed on the overall system. Skilled artisans may implement the described functionality in varying ways for each particular application, but such implementation decisions should not be interpreted as causing a departure from the scope of the present invention.

The various illustrative logical blocks, modules, and circuits described in connection with the embodiments disclosed herein may be implemented or performed with a general purpose processor, a digital signal processor ("DSP"), an application specific integrated circuit ("ASIC"), a field programmable gate array ("FPGA") or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of methods or algorithms described in connection with the embodiments disclosed herein may be embodied directly in hardware, in a software module executed by a processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a user equipment device. Alternatively, the processor and the storage medium may reside as discrete components in a user equipment device.

The previous description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein, but is to be accorded the widest scope consistent with the principles and novel features disclosed herein.

What is claimed is:

1. A method of estimating geographic position of an access point of a Wireless Local Area Network (WLAN), the method comprising:
   sending a plurality of requests for position information of a user equipment (UE) device of a cellular radio network, the UE device being in communication with the access point over the WLAN, the plurality of requests includes a first request for position information at a first time and a second request for position information at a second time;
   receiving the position information in response to the requests;
   assigning the position information to an estimate of the geographic position of the access point by averaging the position information of the UE device at the first time and the position information of the UE device at the second time, wherein, the steps of sending the request and receiving the position information are performed at either the access point or at the cellular radio network, wherein the step of receiving comprises receiving the position information from either the cellular radio network or through a WLAN interface from the UE device; and
   wherein the estimate of the geographic position is stored at the access point.

2. The method of claim 1, wherein the steps of sending the request and receiving the position information are performed at the access point, and the step of receiving comprises receiving the position information from the cellular radio network.

3. The method of claim 2, further comprising:
   providing from the access point telephone service to the UE via the WLAN.

4. The method of claim 3, wherein the WLAN at the access point has a WLAN range of 100 meters or less.

5. The method of claim 3, wherein the WLAN at the access point has a WLAN range of less than 1000 meters.

6. The method of claim 3, wherein the cellular radio network has a cellular range at least twice as long as a range of the WLAN.

7. The method of claim 3, further comprising:
   operating the access point in accordance with an 802.11 standard;

wherein the cellular radio network is a Universal Mobile System (UMTS)-compliant system.

8. The method of claim 3, wherein the steps of sending the request, receiving the position information, assigning the position information, and storing the position information are performed periodically.

9. The method of claim 1, wherein the steps of sending the request and receiving the position information are performed at the access point, and the step of receiving comprises receiving the position information through a WLAN interface from the UE device.

10. The method of claim 1, wherein the steps of sending the request and receiving the position information are performed at the cellular radio network.

11. The method of claim 10, further comprising:
transmitting the estimate from the cellular radio network to the access point.

12. The method of claim 11, further comprising:
receiving at the cellular radio network a request for the estimate;
wherein the step of sending is performed in response to receipt of the request for the estimate.

13. A method of estimating geographic position of an access point of a Wireless Local Area Network (WLAN), the method comprising:
sending a plurality of requests for position information, each request of the plurality of requests relating to position information of one or more User Equipment (UE) devices in communication with a cellular radio network, each UE device of the one or more UE devices being in a service area of the access point over the WLAN, the plurality of requests including a first request for position information at a first time from a first UE device of the one or more UE devices and a second request for position information at a second time from the first UE device;
receiving in response to the plurality of requests a plurality of received replies with position information;
computing an estimate of the geographic position of the access point based at least in part on the plurality of the received replies by averaging the position information of the first UE device at the first time and the position information of the first UE device at the second time, wherein the step of sending comprises transmitting the plurality of requests from either the access point or the cellular radio network to either the one or more UE devices or to the cellular radio network, wherein the steps of receiving are performed at the access point or at the cellular radio network; and
wherein the estimate of the geographic position is stored at the access point.

14. The method of claim 13, further comprising:
providing telephone service to at least one UE device of the one or more UE devices via the WLAN from the access point.

15. The method of claim 13, wherein the WLAN at the access point has a WLAN range of 100 meters or less.

16. The method of claim 13, wherein the WLAN at the access point has a WLAN range of less than 1000 meters.

17. The method of claim 13, wherein the cellular radio network has a cellular range at least twice as long as a range of the WLAN.

18. The method of claim 13, further comprising:
operating the access point in accordance with an 802.11 standard;
wherein the cellular radio network is a Universal Mobile Telecommunications System (UMTS).

19. The method of claim 13, wherein the steps of sending, receiving, and computing are repeated periodically.

20. The method of claim 13, wherein:
the step of sending comprises transmitting the plurality of requests from the access point to the one or more UE devices; and
the steps of receiving and computing are performed at the access point.

21. The method of claim 13, wherein:
the step of sending comprises transmitting the plurality of requests from the access point to the cellular radio network; and
the step of receiving is performed at the access point.

22. The method of claim 21, wherein each request of the plurality of requests relates to position information of a different UE device.

23. The method of claim 21, wherein each request of the plurality of requests relates to position information of the same UE device.

24. The method of claim 21, wherein the plurality of requests comprises a first request relating to the first UE at a first time, a second request relating to a second UE, and a third request relating to the first UE at a second time, the second time being different from the first time, the second UE being different from the first UE.

25. The method of claim 13, wherein:
the step of sending comprises transmitting the plurality of requests from the cellular radio network to the one or more UE devices; and
the steps of receiving and computing are performed at the cellular radio network.

26. The method of claim 13, wherein the plurality of received replies comprises a first received reply with first position information, a second received reply with second position information, and a third received reply with third position information, the method further comprising:
measuring a first round-trip time (RTT) between the access point and a first UE device associated with the first position information;
measuring a second RTT between the access point and a second UE device associated with the second position information; and
measuring a third RTT between the access point and a third UE device associated with the third position information;
wherein the step of computing comprises trilaterating the estimate of the geographic position of the access point from the first position information, the second position information, the third position information, the first RTT, the second RTT, and the third RTT.

27. The method of claim 26, wherein:
the step of sending comprises transmitting the plurality of requests from the access point to the one or more UE devices; and
the step of receiving is performed at the access point.

28. The method of claim 26, wherein:
the step of sending comprises transmitting the plurality of requests from the cellular radio network; and
the step of receiving is performed at the radio network.

29. The method of claim 26, wherein:
the step of sending comprises transmitting the plurality of requests from the access point to the cellular radio network; and
the step of receiving is performed at the access point.

30. The method of claim 26, further comprising:
providing from the access point telephone service to at least one UE device of the one or more UE devices via the WLAN.

31. The method of claim 26, wherein the WLAN at the access point has a WLAN range of 100 meters or less.

32. The method of claim 26, wherein the WLAN at the access point has a WLAN range of less than 1000 meters.

33. The method of claim 26, wherein the cellular radio network has a cellular range at least twice as long as a range of the WLAN.

34. The method of claim 26, further comprising:
operating the access point in accordance with an 802.11 standard;
wherein the cellular radio network is a Universal Mobile Telecommunications System (UMTS).

35. The method of claim 13, wherein the plurality of received replies comprises a first received reply with first position information of the first UE device at a first time, a second received reply with second position information of the first UE at a second time, and a third received reply with third position information of the first UE device at a third time, the method further comprising:
measuring a first round trip time (RTT) between the access point and the first UE device at the first time;
measuring a second RTT between the access point and the first UE device at the second time; and
measuring a third RTT between the access point and the first UE device at the third time;
wherein the step of computing comprises trilaterating the estimate of the geographic position of the access point from the first position information, the second position information, the third position information, the first RTT, the second RTT, and the third RTT.

36. The method of claim 35, wherein:
the step of sending comprises transmitting the plurality of requests from the cellular radio network; and
the step of receiving is performed at the radio network.

37. The method of claim 13, wherein the plurality of received replies comprises a first received reply from the first UE device and a second received reply from the first UE device, the first reply containing position information associated with position of the first UE device at a first point in time, the second reply containing position information associated with position of the first UE device at a second point in time, the first and second points in time being diverse so that the position of the first UE device at the first point in time differs by at least 10 meters from the position of the first UE device at the second point in time.

38. The method of claim 13, further comprising receiving at the access point from the radio network identification of said each UE device of the one or more UE devices in communication with the access point over the WLAN.

39. The method of claim 13, wherein:
the step of sending comprises transmitting the plurality of requests from the cellular radio network to the one or more UE devices;
the steps of receiving is performed at the cellular radio network; and
the step of computing is performed at a computational engine;
the method further comprising:
conveying the position information in the received replies over a communication network to a computational engine;
communicating the estimate over the communication network from the computational engine to a position database; and
storing the estimate at the database.

40. The method of claim 39, wherein the plurality of received replies comprises a first received reply with first position information, a second received reply with second position information, and a third received reply with third position information, the method further comprising:
measuring a first round-trip time (RTT) between the access point and a first UE device associated with the first position information;
measuring a second RTT between the access point and a second UE device associated with the second position information; and
measuring a third RTT between the access point and a third UE device associated with the third position information;
wherein the step of computing comprises trilaterating the estimate of the geographic position of the access point from the first position information, the second position information, the third position information, the first RTT, the second RTT, and the third RTT.

41. The method of claim 13, further comprising:
operating the cellular radio network as a Universal Mobile Telecommunications System (UMTS);
wherein the access point is operating under an 802.11 standard.

42. The method of claim 13, wherein no two of the received replies used in the step of computing originated from the same UE device.

43. A method of facilitating estimation of geographic position of an access point of a Wireless Local Area Network (WLAN), the method comprising:
sending from a cellular radio network a plurality of requests for position information, each request of the plurality of requests relating to position information of one or more User Equipment (UE) devices of the cellular radio network, each UE device of the one or more UE devices being in communication with the access point over the WLAN, the plurality of requests including a first request for position information at a first time from a first UE device and a second request for position information at a second time from the first UE device;
receiving in response to the plurality of requests a plurality of received replies with position information;
transmitting average position information corresponding to the plurality of replies from the cellular radio network to the access point, the average position information being an average of the position information of the first UE device at the first time and the position information of the first UE device at the second time, wherein receiving the position information is received from either the cellular radio network or through a WLAN interface from the UE device; and
wherein the estimate of the geographic position is stored at the access point.

44. The method of claim 43, further comprising:
operating the cellular radio network as a Universal Mobile Telecommunications System (UMTS);
wherein the access point is operating under an 802.11 standard.

45. A method of provisioning an estimate of geographic position of an access point of a Wireless Local Area Network (WLAN), the method comprising:
sending from a cellular radio network a plurality of requests for position information, each request for position information of the plurality of requests relating to position information of one or more User Equipment (UE) devices of the cellular radio network, each UE device of the one or more UE devices being in communication with the access point over the WLAN, the plurality of requests including a first request for position information at a first time from a first UE device of the one or more UE devices and a second request for position information at a second time from the first UE device;

receiving, in response to the plurality of requests, a plurality of received replies with position information;

computing the estimate of the geographic position of the access point based at least in part on the plurality of received replies by averaging the position information of the first UE device at the first time and the position information of the first UE device at the second time;

transmitting the estimate from the cellular radio network to the access point;

wherein receiving the position information is received from either the cellular radio network, at the cellular radio network, or through a WLAN interface from the UE device; and wherein the estimate of the geographic position is stored at the access point.

46. The method of claim 45, further comprising:
receiving at the cellular radio network from the access point a request for the estimate of the geographic location;

wherein the step of sending is performed in response to the receiving of the request for the estimate of the geographic location.

47. The method of claim 45, wherein the plurality of received replies comprises a first received reply from a first UE device and a second received reply from the first UE device, the first reply containing position information associated with position of the first UE device at a first point in time, the second reply containing position information associated with position of the first UE device at a second point in time, the first and second points in time being diverse so that the position of the first UE device at the first point in time differs by at least 10 meters from the position of the first UE device at the second point in time.

48. A method of provisioning an estimate of geographic position of an access point of a Wireless Local Area Network (WLAN), the method comprising:
determining at a cellular radio network a plurality of UE device positions, each UE device position corresponding to position of at least one User Equipment (UE) device of the cellular radio network, the at least one UE device being in communication with the access point over the WLAN, wherein determining a plurality of UE device positions includes determining first position information at a first time for a first UE device of the at least one UE device and second position information at a second time for the first UE device;

computing the estimate of the geographic position of the access point based at least in part on the plurality of UE device positions by averaging the first position information and the second position information;

transmitting the estimate from the cellular radio network to the access point; and storing at the cellular radio network volatility information of the estimate.

49. The method of claim 48, wherein the step of determining is performed by angular measurement and triangulation.

50. The method of claim 48, wherein the step of determining is performed by round-trip time (RTT) measurement and trilateration.

51. The method of claim 48, further comprising:
operating the cellular radio network as a Universal Mobile Telecommunications System (UMTS);
wherein the access point is operating under an 802.11 standard.

52. The method of claim 48, further comprising:
receiving at the radio network one or more identifications of the at least one UE device that is in communication with the access point over the WLAN.

53. The method of claim 48, wherein the step of determining is initiated by the cellular radio network autonomously.

54. The method of claim 53, further comprising:
receiving at the cellular radio network a request for the estimate sent by the access point after the step of determining;
wherein the step of transmitting is performed in response to the step of receiving of the request for the estimate.

55. The method of claim 48, further comprising:
repeating the steps of determining and computing to obtain a plurality of estimates of the geographic position of the access point; and
averaging the plurality of the estimates.

56. The method of claim 48, wherein:
the plurality of UE device positions comprises a first UE device position, a second UE device position, and a third UE device position;
the step of determining comprises:
receiving, from the access point, at the cellular radio network a first round-trip time (RTT) measurement corresponding to the first UE device position, a second RTT measurement corresponding to the second UE device position, and a third RTT measurement corresponding to the third UE device position, and
trilaterating the estimate of the geographic position of the access point from the first UE device position, the second UE device position, the third UE device position, the first RTT measurement, the second RTT measurement, and the third RTT measurement.

57. The method of claim 48, wherein:
the step of determining comprises a step for determining at the cellular radio network the plurality of UE device positions; and
the step of computing comprises a step for computing the estimate of the geographic position of the access point based at least in part on the plurality of UE device positions.

58. An access point of a Wireless Local Area Network (WLAN), comprising:
a transceiver;
a memory storing program code; and
a processor coupled to the memory and to the transceiver, wherein the processor is configured to cause the access point to:
send a plurality of requests for position information of a user equipment (UE) device of a cellular radio network, the UE device being in communication with the access point over the WLAN, the plurality of requests includes a first request for position information at a first time and a second request for position information at a second time;
receive the position information in response to the requests; and
assign the position information to an estimate of the geographic position of the access point by averaging the position of the UE device at the first time and the position information of the UE device at the second time, wherein, the processor is configured to send the request and receive the position information at either the access point or at the cellular radio network, wherein the step of receiving comprises receiving the position information from either the cellular radio network or through a WLAN interface from the UE device, wherein the estimate of the geographic position is stored at the access point.

59. The access point of claim 58, further comprising:
a second network interface;
wherein the processor configures the access point to provide telephone service to the UE device via the WLAN and the second network interface.

60. An access point of a Wireless Local Area Network (WLAN), comprising:
a transceiver;
a connection to a second network interface connecting the access point to a cellular radio network;
a memory storing program code; and
a processor coupled to the memory and to the transceiver, wherein the processor is configured to cause the access point to:
send a plurality of requests for position information, each request of the plurality of requests relating to position information of one or more User Equipment (UE) devices in communication with the cellular radio network, each UE device of the one or more UE devices being in a service area of the access point over the WLAN, the plurality of requests including a first request for position information at a first time from a first UE device of the one or more UE devices and a second request for position information at a second time from the first UE device;
receive in response to the plurality of requests a plurality of received replies with position information; and
compute an estimate of the geographic position of the access point based at least in part on the plurality of the received replies by averaging the position information of the first UE device at the first time and the position information of the first UE device at the second time, wherein, the sending the request and receiving the position information are performed at either the access point or at the cellular radio network, wherein the step of receiving comprises receiving the position information from either the cellular radio network or through a WLAN interface from the UE device, wherein the estimate of the geographic position is stored at the access point.

61. The access point of claim 60, wherein:
the plurality of replies comprises a first reply with first position information of the first UE device, a second reply with second position information of a second UE device, and third reply with third position information of a third UE device;
the processor is further configured to cause the access point to:
measure a first round-trip time (RTT) between the access point and the first UE device;
measure a second RTT between the access point and the second UE device;
measure a third RTT between the access point and the third UE device; and
trilaterate the estimate of the geographic position from the first position information, the second position information, the third position information, the first RTT, the second RTT, and the third RTT.

62. The access point of claim 60, wherein:
the plurality of replies comprises a first reply with first position information of the first UE device at a first time, a second reply with second position information of the first UE device at a second time, and third reply with third position information of the first UE device at a third time;
the processor is further configured to cause the access point to:
measure a first round-trip time (RTT) between the access point and the first UE device at about the first time;
measure a second RTT between the access point and the first UE device at about the second time;
measure a third RTT between the access point and the first UE device at about the third time; and
trilaterate the estimate of the geographic position from the first position information, the second position information, the third position information, the first RTT, the second RTT, and the third RTT.

63. A non-transitory machine-readable medium comprising instructions, the instructions, when executed by a processor of a Wireless Local Area Network (WLAN) access point cause the access point to perform operations comprising:
sending a plurality of requests for position information, each request of the plurality of requests relating to position information of one or more User Equipment (UE) devices in communication with a cellular radio network, each UE device of the one or more UE devices being in a service area of the access point over the WLAN, the plurality of requests including a first request for position information at a first time from a first UE device of the one or more UE devices and a second request for position information at a second time from the first UE device;
receiving in response to the plurality of requests a plurality of received replies with position information; and
computing an estimate of the geographic position of the access point based at least in part on the plurality of the received replies by averaging the position information of the first UE device at the first time and the position information of the first UE device at the second time, wherein, the sending the request and receiving the position information are performed at either the access point or at the cellular radio network, wherein the step of receiving comprises receiving the position information from either the cellular radio network or through a WLAN interface from the UE device, wherein the estimate of the geographic position is stored at the access point.

64. A radio network controller in a cellular radio network, the radio network controller comprising:
a BTS interface to a base transceiver station;
a network interface for coupling the radio network controller to a Wireless Local Area Network (WLAN) comprising an access point;
a memory storing program code; and
a processor coupled to the memory, the BTS interface, and the network interface;
wherein the processor is configured to cause the radio network controller to:
send a plurality of requests for position information, each request of the plurality of requests relating to position information of one or more User Equipment (UE) devices in communication with the cellular radio network, each UE device of the one or more UE devices being in a service area of the access point over the WLAN, the plurality of requests including a first request for position information at a first time from a first UE device of the one or more UE devices and a second request for position information at a second time from the first UE device;
receive in response to the plurality of requests a plurality of received replies with position information;
compute an estimate of the geographic position of the access point based at least in part on the plurality of the received replies by averaging the position information of the first UE device at the first time and the position information of the first UE device at the second time; and
transmit the estimate to the access point via the network interface, wherein the estimate of the geographic position is stored at the access point.

65. A radio network controller in a cellular radio network, the radio network controller comprising:
a BTS interface to a base transceiver station;
a network interface coupling the radio network controller to a Wireless Local Area Network (WLAN) comprising an access point;
a memory storing program code; and
a processor coupled to the memory, the BTS interface, and the network interface;
wherein the processor is configured to cause the radio network controller to:
send a plurality of requests for position information, each request of the plurality of requests relating to position information of one or more User Equipment (UE) devices in communication with the cellular radio network, each UE device of the one or more UE devices being in a service area of the access point over the WLAN, the plurality of requests including a first request for position information at a first time from a first UE device of the one or more UE devices and a second request for position information at a second time from the first UE device;
receive in response to the plurality of requests a plurality of replies with position information; and
transmit average position information corresponding to the plurality of replies to the access point via the network interface, the average position information being an average of the position information of the first UE device at the first time and the position information of the first UE device at the second time, wherein the estimate of the geographic position is stored at the access point.

66. A non-transitory machine-readable medium comprising instructions, the instructions, when executed by a processor of a radio network controller of a cellular radio network, cause the cellular radio network to perform operations comprising:
sending a plurality of requests for position information, each request of the plurality of requests relating to position information of one or more User Equipment (UE) devices in communication with the cellular radio network, each UE device of the one or more UE devices being in a service area of a Wireless Local Area Network (WLAN) access point, the plurality of requests including a first request for position information at a first time from a first UE device of the one or more UE devices and a second request for position information at a second time from the first UE device;
receiving in response to the plurality of requests a plurality of received replies with position information;
computing an estimate of the geographic position of the access point based at least in part on the plurality of the received replies by averaging the position information of the first UE device at the first time and the position information of the first UE device at the second time; and
transmitting the estimate to the access point via the network interface, wherein the estimate of the geographic position is stored at the access point.

67. A non-transitory machine-readable medium comprising instructions, the instructions, when executed by a processor of a radio network controller of a cellular radio network, cause the radio network controller to perform operations comprising:
sending a plurality of requests for position information, each request of the plurality of requests relating to position information of one or more User Equipment (UE) devices in communication with the cellular radio network, each UE device of the one or more UE devices being in a service area of a Wireless Local Area Network (WLAN) access point, the plurality of requests including a first request for position information at a first time from a first UE device of the one or more UE devices and a second request for position information at a second time from the first UE device;
receiving in response to the plurality of requests a plurality of replies with position information; and
transmitting average position information corresponding to the replies to the access point via a network interface of the radio network controller, the average position information being an average of the position information of the first UE device at the first time and the position information of the first UE device at the second time, wherein the estimate of the geographic position is stored at the access point.

* * * * *